US011477747B2

(12) United States Patent
Li et al.

(10) Patent No.: US 11,477,747 B2
(45) Date of Patent: Oct. 18, 2022

(54) SYNCHRONIZATION SIGNAL PERIODICITY ADJUSTMENT

(71) Applicant: QUALCOMM Incorporated, San Diego, CA (US)

(72) Inventors: Junyi Li, Chester, NJ (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/806,996

(22) Filed: Mar. 2, 2020

(65) Prior Publication Data
US 2020/0337004 A1 Oct. 22, 2020

Related U.S. Application Data

(60) Provisional application No. 62/835,431, filed on Apr. 17, 2019.

(51) Int. Cl.
*H04W 56/00* (2009.01)
*H04W 76/27* (2018.01)
*H04W 24/08* (2009.01)

(52) U.S. Cl.
CPC ......... *H04W 56/003* (2013.01); *H04W 24/08* (2013.01); *H04W 56/001* (2013.01); *H04W 76/27* (2018.02)

(58) Field of Classification Search
None
See application file for complete search history.

(56) References Cited

U.S. PATENT DOCUMENTS

| 7,016,649 B1 | 3/2006 | Narasimhan et al. |
| 8,327,002 B1 | 12/2012 | Van Dussen et al. |

(Continued)

FOREIGN PATENT DOCUMENTS

| EP | 1515471 A1 | 3/2005 |
| EP | 2120364 A1 | 11/2009 |

(Continued)

OTHER PUBLICATIONS

Qualcomm Incorporated: "Resource Allocation for PUCCH", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. Ran WG1, No. Prague, CZ, Oct. 9, 2017-Oct. 13, 2017, Oct. 8, 2017, XP051341951, 10 pages, Retrieved from the Internet: URL: http://www.3gpp.org/ftp/Meetings_3GPP_SYNC/RAN1/Docs/, [retrieved on Oct. 8, 2017], paragraph [0002].

(Continued)

*Primary Examiner* — Saad Khawar
(74) *Attorney, Agent, or Firm* — Holland & Hart LLP/Qualcomm Incorporated

(57) ABSTRACT

Methods, systems, and devices for wireless communications are described. Different periodicities may be dynamically selected when monitoring and transmitting signaling used for link management, where respective periodicities may be based on the quality of the link between devices. For instance, a first wireless device may use a first monitoring periodicity to monitor for signals transmitted from another wireless device. Upon determining that a link condition has changed (e.g., decreased or reached a threshold), the first wireless device may decrease its monitoring periodicity (and increase monitoring frequency) to detect signals transmitted by the other wireless device more frequently. In such cases, (Continued)

the other wireless device may likewise transmit its measurement signals more often (e.g., in accordance with a second periodicity) based on the link quality. The adjusted monitoring and transmission periodicities may provide additional occasions for the wireless device to detect signals from another device.

47 Claims, 14 Drawing Sheets

(56) References Cited

U.S. PATENT DOCUMENTS

| | | | |
|---|---|---|---|
| 9,319,886 B2 | 4/2016 | Jo et al. | |
| 9,877,322 B1 | 1/2018 | Sung et al. | |
| 10,736,054 B2 | 8/2020 | Jiang et al. | |
| 2005/0106910 A1 | 5/2005 | Chiu | |
| 2006/0285504 A1 | 12/2006 | Dong et al. | |
| 2008/0268786 A1 | 10/2008 | Baker et al. | |
| 2009/0046653 A1 | 2/2009 | Singh et al. | |
| 2009/0210474 A1 | 8/2009 | Shao et al. | |
| 2010/0113041 A1 | 5/2010 | Bienas et al. | |
| 2010/0329195 A1 | 12/2010 | Abraham et al. | |
| 2010/0331030 A1 | 12/2010 | Nory et al. | |
| 2011/0085502 A1 | 4/2011 | Malladi | |
| 2011/0249578 A1 | 10/2011 | Nayeb Nazar et al. | |
| 2012/0157108 A1 | 6/2012 | Boudreau et al. | |
| 2013/0003788 A1 | 1/2013 | Marinier et al. | |
| 2013/0265916 A1 | 10/2013 | Zhu et al. | |
| 2013/0301454 A1 | 11/2013 | Seol et al. | |
| 2014/0071954 A1 | 3/2014 | Au et al. | |
| 2014/0098761 A1 | 4/2014 | Lee et al. | |
| 2014/0105136 A1 | 4/2014 | Tellado et al. | |
| 2014/0206382 A1 | 7/2014 | Shabtay | |
| 2014/0254537 A1 | 9/2014 | Kim et al. | |
| 2014/0274141 A1 | 9/2014 | Gholmieh et al. | |
| 2014/0362716 A1* | 12/2014 | Zhang | H04W 36/0088 370/252 |
| 2015/0011236 A1 | 1/2015 | Kazmi et al. | |
| 2015/0365939 A1 | 12/2015 | Zhang et al. | |
| 2016/0066301 A1 | 3/2016 | Zhu et al. | |
| 2016/0088648 A1 | 3/2016 | Xue et al. | |
| 2016/0270116 A1 | 9/2016 | Lin et al. | |
| 2016/0295595 A1 | 10/2016 | Chae et al. | |
| 2016/0308280 A1 | 10/2016 | Shimizu | |
| 2016/0315686 A1 | 10/2016 | Song et al. | |
| 2017/0034837 A1 | 2/2017 | Lopez-Perez et al. | |
| 2017/0070961 A1 | 3/2017 | Bharadwaj et al. | |
| 2017/0086080 A1 | 3/2017 | Sun et al. | |
| 2017/0093038 A1 | 3/2017 | Li et al. | |
| 2017/0215201 A1 | 7/2017 | Kim et al. | |
| 2017/0265169 A1 | 9/2017 | Chen et al. | |
| 2017/0290008 A1 | 10/2017 | Tooher et al. | |
| 2017/0310426 A1 | 10/2017 | Fan et al. | |
| 2017/0325164 A1 | 11/2017 | Lee et al. | |
| 2018/0020452 A1 | 1/2018 | Yerramalli et al. | |
| 2018/0042031 A1 | 2/2018 | Hampel et al. | |
| 2018/0049137 A1 | 2/2018 | Li et al. | |
| 2018/0054339 A1 | 2/2018 | Sun et al. | |
| 2018/0092073 A1 | 3/2018 | Nogami et al. | |
| 2018/0124790 A1 | 5/2018 | Yerramalli | |
| 2018/0132197 A1 | 5/2018 | Lin et al. | |
| 2018/0145798 A1 | 5/2018 | Suzuki et al. | |
| 2018/0145819 A1 | 5/2018 | Axmon et al. | |
| 2018/0198181 A1 | 7/2018 | Fukasawa | |
| 2018/0220465 A1 | 8/2018 | Zhang et al. | |
| 2018/0234337 A1 | 8/2018 | Goliya et al. | |
| 2018/0242264 A1 | 8/2018 | Pelletier et al. | |
| 2018/0249492 A1 | 8/2018 | Xu et al. | |
| 2018/0324716 A1 | 11/2018 | Jeon et al. | |
| 2018/0324853 A1 | 11/2018 | Jeon et al. | |
| 2018/0367263 A1 | 12/2018 | Ying et al. | |
| 2018/0375619 A1 | 12/2018 | Hwang et al. | |
| 2019/0007181 A1 | 1/2019 | Marinier et al. | |
| 2019/0044639 A1 | 2/2019 | Ouchi et al. | |
| 2019/0044647 A1 | 2/2019 | Tomeba et al. | |
| 2019/0053072 A1 | 2/2019 | Kundargi et al. | |
| 2019/0053205 A1 | 2/2019 | Tomeba et al. | |
| 2019/0082457 A1 | 3/2019 | Zhou et al. | |
| 2019/0089498 A1 | 3/2019 | Pelletier et al. | |
| 2019/0116605 A1 | 4/2019 | Luo et al. | |
| 2019/0182870 A1 | 6/2019 | Shih et al. | |
| 2019/0208538 A1 | 7/2019 | Lee et al. | |
| 2019/0215766 A1 | 7/2019 | Wu et al. | |
| 2019/0215896 A1 | 7/2019 | Zhou et al. | |
| 2019/0253136 A1 | 8/2019 | Makki et al. | |
| 2019/0260495 A1 | 8/2019 | Nammi | |
| 2019/0288765 A1* | 9/2019 | Lee | H04L 25/0226 |
| 2019/0313406 A1 | 10/2019 | Liu et al. | |
| 2019/0327123 A1 | 10/2019 | Wang et al. | |
| 2020/0015209 A1 | 1/2020 | Zhang | |
| 2020/0107335 A1 | 4/2020 | Xue et al. | |
| 2020/0107355 A1 | 4/2020 | Zhou | |
| 2020/0145860 A1* | 5/2020 | Koskela | H04W 76/14 |
| 2020/0146059 A1 | 5/2020 | Cirik et al. | |
| 2020/0288409 A1 | 9/2020 | Li | |
| 2020/0296673 A1 | 9/2020 | Ouchi et al. | |
| 2020/0328850 A1 | 10/2020 | Feng | |
| 2020/0336920 A1 | 10/2020 | Li et al. | |
| 2020/0336942 A1 | 10/2020 | Li et al. | |
| 2020/0336946 A1 | 10/2020 | Li et al. | |
| 2020/0336994 A1 | 10/2020 | Li et al. | |
| 2020/0337028 A1 | 10/2020 | Li et al. | |
| 2021/0022091 A1 | 1/2021 | Li et al. | |
| 2021/0037441 A1 | 2/2021 | Khalid et al. | |
| 2021/0136639 A1* | 5/2021 | Osawa | H04W 24/10 |
| 2021/0168782 A1* | 6/2021 | Hamidi-Sepehr | H04L 5/0051 |
| 2021/0195674 A1 | 6/2021 | Park et al. | |
| 2021/0204307 A1 | 7/2021 | Lee et al. | |

FOREIGN PATENT DOCUMENTS

| | | | |
|---|---|---|---|
| EP | 2504942 A1 | 10/2012 | |
| EP | 3179660 A1 | 6/2017 | |
| KR | 20180136855 A | 12/2018 | |
| WO | WO-2016040290 A1 | 3/2016 | |
| WO | WO-2019070579 A1 | 4/2019 | |

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

International Search Report and Written Opinion—PCT/US2020/020829—ISA/EPO—dated Jun. 19, 2020 (192021WO).

LG Electronics: "Discussions on Mechanisms to Support NR IAB Scenarios," 3GPP Draft, 3GPP TSG RAN WG1 Meeting #94bis, R1-1810273, Discussions on NR IAB Support_V0, 3rd Generation Partnership Project, (3gpp), Mobile Competence Centre; 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/

(56) References Cited

OTHER PUBLICATIONS

TSGR1%5F94b/Docs/R1%2D1810273%2Ezip [retrieved on Sep. 29, 2018] Chapter 6 "Access and backhaul Timing," Chapter 7 "TDM Patterns".
Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].

* cited by examiner

SYNCHRONIZATION SIGNAL PERIODICITY ADJUSTMENT

CROSS REFERENCE

The present application for patent claims the benefit of U.S. Provisional Patent Application No. 62/835,431 by L I et al., entitled "SYNCHRONIZATION SIGNAL PERIODICITY ADJUSTMENT," filed Apr. 17, 2019, assigned to the assignee hereof, and expressly incorporated herein.

INTRODUCTION

The following relates generally to wireless communications, and more specifically to synchronization signal configurations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of communications at a first device is described. The method may include determining a configuration of an actual transmission periodicity and at least one virtual transmission periodicity used by a second device. The method may include selecting a monitoring periodicity corresponding to the actual transmission periodicity or the at least one virtual transmission periodicity based on one or more parameters. The method may include monitoring for one or more measurement signals transmitted by the second device over a communication link in accordance with the selected monitoring periodicity.

An apparatus for communications at a first device is described. The apparatus may include a processor, and memory coupled to the processor. The processor and memory may be configured to determine a configuration of an actual transmission periodicity and at least one virtual transmission periodicity used by a second device. The processor and memory may be configured to select a monitoring periodicity corresponding to the actual transmission periodicity or the at least one virtual transmission periodicity based on one or more parameters. The processor and memory may be configured to monitor for one or more measurement signals transmitted by the second device over a communication link in accordance with the selected monitoring periodicity.

Another apparatus for communications at a first device is described. The apparatus may include means for determining a configuration of an actual transmission periodicity and at least one virtual transmission periodicity used by a second device. The apparatus may include means for selecting a monitoring periodicity corresponding to the actual transmission periodicity or the at least one virtual transmission periodicity based on one or more parameters. The apparatus may include means for monitoring for one or more measurement signals transmitted by the second device over a communication link in accordance with the selected monitoring periodicity.

A non-transitory computer-readable medium storing code for communications at a first device is described. The code may include instructions executable by a processor to determine a configuration of an actual transmission periodicity and at least one virtual transmission periodicity used by a second device. The code may include instructions executable by a processor to select a monitoring periodicity corresponding to the actual transmission periodicity or the at least one virtual transmission periodicity based on one or more parameters. The code may include instructions executable by a processor to monitor for one or more measurement signals transmitted by the second device over a communication link in accordance with the selected monitoring periodicity.

In some examples of the method, apparatuses, and non-transitory computer-readable medium described herein, the one or more parameters include a link condition.

In some examples of the method, apparatuses, and non-transitory computer-readable medium described herein, the link condition includes an error rate for information transmitted over the communication link.

Some examples of the method, apparatuses, and non-transitory computer-readable medium described herein may further include operations, features, means, or instructions for determining a link condition of the communication link between the first device and the second device.

Some examples of the method, apparatuses, and non-transitory computer-readable medium described herein may further include operations, features, means, or instructions for selecting the monitoring periodicity to correspond to the actual transmission periodicity. Some examples may further include operations, features, means, or instructions for determining that a link condition satisfies a threshold, and adjusting the monitoring periodicity to correspond to the at least one virtual transmission periodicity based on the link condition satisfying the threshold, the at least one virtual transmission periodicity being shorter than the actual transmission periodicity.

Some examples of the method, apparatuses, and non-transitory computer-readable medium described herein may further include operations, features, means, or instructions for starting a timer based on adjusting the monitoring periodicity to correspond to the at least one virtual transmission periodicity. Some examples may further include operations, features, means, or instructions for determining that the timer may have expired, and monitoring for the one or more measurement signals transmitted from one or more other devices based on the timer expiring.

Some examples of the method, apparatuses, and non-transitory computer-readable medium described herein may further include operations, features, means, or instructions for determining that the link condition satisfies a second threshold, and adjusting the monitoring periodicity to correspond to the actual transmission periodicity based on the link condition satisfying the second threshold.

Some examples of the method, apparatuses, and non-transitory computer-readable medium described herein may further include operations, features, means, or instructions for determining that the communication link may have failed based on a link condition, establishing a connection with one or more other devices based on the failed communication link, and receiving the one or more measurement signals from the one or more other devices.

Some examples of the method, apparatuses, and non-transitory computer-readable medium described herein may further include operations, features, means, or instructions for receiving an indication that the second device may be transmitting the one or more measurement signals in accordance with the at least one virtual transmission periodicity. Some examples may further include operations, features, means, or instructions for selecting the monitoring periodicity to correspond to the at least one virtual transmission periodicity based on the indication.

Some examples of the method, apparatuses, and non-transitory computer-readable medium described herein may further include operations, features, means, or instructions for selecting the monitoring periodicity to correspond to the at least one virtual transmission periodicity based on a link condition, and transmitting, to the second device, an indication that the monitoring periodicity corresponds to the at least one virtual transmission periodicity.

Some examples of the method, apparatuses, and non-transitory computer-readable medium described herein may further include operations, features, means, or instructions for operating in a first monitoring mode associated with the actual transmission periodicity.

Some examples of the method, apparatuses, and non-transitory computer-readable medium described herein may further include operations, features, means, or instructions for operating in a second monitoring mode associated with the at least one virtual transmission periodicity.

In some examples of the method, apparatuses, and non-transitory computer-readable medium described herein, determining the configuration of the actual transmission periodicity and the at least one virtual transmission periodicity may include operations, features, means, or instructions for receiving an indication of the configuration via radio resource control (RRC) signaling.

Some examples of the method, apparatuses, and non-transitory computer-readable medium described herein may further include operations, features, means, or instructions for receiving the one or more measurement signals from the second device based on the monitoring.

In some examples of the method, apparatuses, and non-transitory computer-readable medium described herein, the one or more measurement signals include synchronization signal blocks (SSBs), or channel state information reference signals (CSI-RSs), or sounding reference signals (SRSs), or a combination thereof.

In some examples of the method, apparatuses, and non-transitory computer-readable medium described herein, the first device includes a first node in an integrated access and backhaul (IAB) network and the second device includes a second node in the IAB network.

In some examples of the method, apparatuses, and non-transitory computer-readable medium described herein, the communication link includes one or more directional beams operating over a millimeter wave (mmW) radio frequency spectrum band.

A method of communications at a first device is described. The method may include determining a configuration of an actual transmission periodicity and at least one virtual transmission periodicity. The method may include selecting a transmission periodicity corresponding to the actual transmission periodicity or the at least one virtual transmission periodicity based on one or more parameters. The method may include transmitting one or more measurement signals to a second device over a communication link in accordance with the selected transmission periodicity.

An apparatus for communications at a first device is described. The apparatus may include a processor, and memory coupled to the processor. The processor and memory may be configured to determine a configuration of an actual transmission periodicity and at least one virtual transmission periodicity. The processor and memory may be configured to select a transmission periodicity corresponding to the actual transmission periodicity or the at least one virtual transmission periodicity based on one or more parameters. The processor and memory may be configured to cause the apparatus to transmit one or more measurement signals to a second device over a communication link in accordance with the selected transmission periodicity.

Another apparatus for communications at a first device is described. The apparatus may include means for determining a configuration of an actual transmission periodicity and at least one virtual transmission periodicity. The apparatus may include means for selecting a transmission periodicity corresponding to the actual transmission periodicity or the at least one virtual transmission periodicity based on one or more parameters. The apparatus may include means for transmitting one or more measurement signals to a second device over a communication link in accordance with the selected transmission periodicity.

A non-transitory computer-readable medium storing code for communications at a first device is described. The code may include instructions executable by a processor to determine a configuration of an actual transmission periodicity and at least one virtual transmission periodicity. The code may include instructions executable by a processor to select a transmission periodicity corresponding to the actual transmission periodicity or the at least one virtual transmission periodicity based on one or more parameters. The code may include instructions executable by a processor to transmit one or more measurement signals to a second device over a communication link in accordance with the selected transmission periodicity.

In some examples of the method, apparatuses, and non-transitory computer-readable medium described herein, the one or more parameters include a link condition.

Some examples of the method, apparatuses, and non-transitory computer-readable medium described herein may further include operations, features, means, or instructions for determining a link condition of the communication link between the first device and the second device.

Some examples of the method, apparatuses, and non-transitory computer-readable medium described herein may further include operations, features, means, or instructions for selecting the transmission periodicity to correspond to the actual transmission periodicity. Some examples may further include operations, features, means, or instructions for determining that a link condition satisfies a threshold, and adjusting the transmission periodicity to correspond to the at least one virtual transmission periodicity based on the link condition satisfying the threshold, the at least one virtual transmission periodicity being shorter than the actual transmission periodicity.

Some examples of the method, apparatuses, and non-transitory computer-readable medium described herein may further include operations, features, means, or instructions for starting a timer based on adjusting the transmission periodicity to correspond to the at least one virtual transmission periodicity. Some examples may further include operations, features, means, or instructions for determining that the timer may have expired, and transmitting, to one or more other devices, an indication to transmit the one or more measurement signals in accordance with the at least one virtual transmission periodicity.

Some examples of the method, apparatuses, and non-transitory computer-readable medium described herein may further include operations, features, means, or instructions for determining that the link condition satisfies a second threshold, and adjusting the transmission periodicity to correspond to the actual transmission periodicity based on the link condition satisfying the second threshold.

Some examples of the method, apparatuses, and non-transitory computer-readable medium described herein may further include operations, features, means, or instructions for transmitting, to one or more other devices, an indication to transmit the one or more measurement signals in accordance with the at least one virtual transmission periodicity based on a link condition.

Some examples of the method, apparatuses, and non-transitory computer-readable medium described herein may further include operations, features, means, or instructions for transmitting, to one or more other devices, symbol timing information for transmitting the one or more measurement signals.

Some examples of the method, apparatuses, and non-transitory computer-readable medium described herein may further include operations, features, means, or instructions for selecting the transmission periodicity to correspond to the at least one virtual transmission periodicity based on a link condition, and transmitting, to the second device, an indication that the transmission periodicity corresponds to the at least one virtual transmission periodicity.

Some examples of the method, apparatuses, and non-transitory computer-readable medium described herein may further include operations, features, means, or instructions for receiving an indication that the second device may be monitoring for the one or more measurement signals in accordance with the at least one virtual transmission periodicity. Some examples may further include operations, features, means, or instructions for selecting the transmission periodicity to correspond to the at least one virtual transmission periodicity based on the indication.

Some examples of the method, apparatuses, and non-transitory computer-readable medium described herein may further include operations, features, means, or instructions for operating in a first transmission mode associated with the actual transmission periodicity.

Some examples of the method, apparatuses, and non-transitory computer-readable medium described herein may further include operations, features, means, or instructions for operating in a second transmission mode associated with the at least one virtual transmission periodicity.

In some examples of the method, apparatuses, and non-transitory computer-readable medium described herein, transmitting the configuration of the actual transmission periodicity and the at least one virtual transmission periodicity may include operations, features, means, or instructions for transmitting an indication of the configuration via RRC signaling.

A method of communications at a first device is described. The method may include transmitting one or more measurement signals to a first set of one or more devices in accordance with a transmission periodicity. The method may include receiving, from a second device, an indication to adjust the transmission periodicity to at least one virtual transmission periodicity based on one or more parameters of a communication link between the second device and a second set of one or more devices. The method may include transmitting the one or more measurement signals to a second set of one or more devices in accordance with the at least one virtual transmission periodicity.

An apparatus for communications at a first device is described. The apparatus may include a processor, and memory coupled to the processor. The processor and memory may be configured to transmit one or more measurement signals to a first set of one or more devices in accordance with a transmission periodicity. The processor and memory may be configured to receive, from a second device, an indication to adjust the transmission periodicity to at least one virtual transmission periodicity based on one or more parameters of a communication link between the second device and a second set of one or more devices. The processor and memory may be configured to transmit the one or more measurement signals to a second set of one or more devices in accordance with the at least one virtual transmission periodicity.

Another apparatus for communications at a first device is described. The apparatus may include means for transmitting one or more measurement signals to a first set of one or more devices in accordance with a transmission periodicity. The apparatus may include means for receiving, from a second device, an indication to adjust the transmission periodicity to at least one virtual transmission periodicity based on one or more parameters of a communication link between the second device and a second set of one or more devices. The apparatus may include means for transmitting the one or more measurement signals to a second set of one or more devices in accordance with the at least one virtual transmission periodicity.

A non-transitory computer-readable medium storing code for communications at a first device is described. The code may include instructions executable by a processor to transmit one or more measurement signals to a first set of one or more devices in accordance with a transmission periodicity. The code may include instructions executable by a processor to receive, from a second device, an indication to adjust the transmission periodicity to at least one virtual transmission periodicity based on one or more parameters of a communication link between the second device and a second set of one or more devices. The code may include instructions executable by a processor to transmit the one or more measurement signals to a second set of one or more devices in accordance with the at least one virtual transmission periodicity.

In some examples of the method, apparatuses, and non-transitory computer-readable medium described herein, the one or more parameters include a link condition.

Some examples of the method, apparatuses, and non-transitory computer-readable medium described herein may further include operations, features, means, or instructions for receiving a configuration of at least one virtual transmission periodicity used by the second device, the configuration being received prior to the indication from the second device, where the at least one virtual transmission periodicity may be a based on the configuration.

Some examples of the method, apparatuses, and non-transitory computer-readable medium described herein may further include operations, features, means, or instructions for determining a configuration of the at least one virtual transmission periodicity.

Some examples of the method, apparatuses, and non-transitory computer-readable medium described herein may further include operations, features, means, or instructions for receiving, from a second device, symbol timing information, and transmitting the one or more measurement signals to the second set of one or more devices based on the symbol timing information.

In some examples of the method, apparatuses, and non-transitory computer-readable medium described herein, the at least one virtual transmission periodicity may be shorter than the transmission periodicity.

In some examples of the method, apparatuses, and non-transitory computer-readable medium described herein, the first wireless device includes a first node in an IAB network and the second wireless device includes a second node in the IAB network.

DETAILED DESCRIPTION

Figure 1:
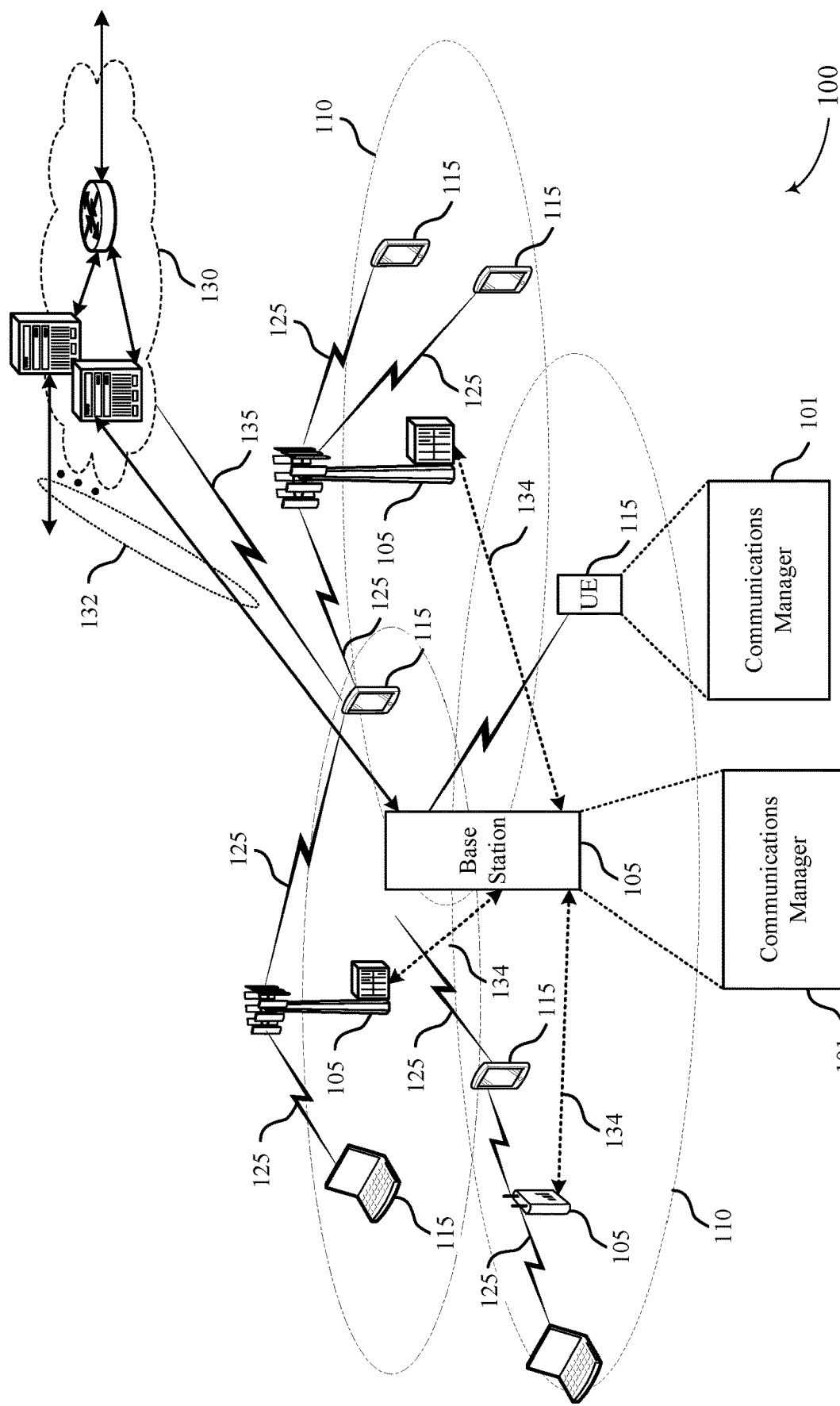
FIG. 1 illustrates an example of a system for wireless communications that supports synchronization signal periodicity adjustment in accordance with one or more aspects of the present disclosure.

Wireless communication systems may operate in mmW frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Due to the increased amount of pathloss in mmW communication systems, transmissions between wireless devices may be beamformed. A receiving device may also use beamforming techniques to configure antenna(s) and/or antenna array(s) such that transmissions are received in a directional manner.

Some wireless communications systems may include access nodes to facilitate wireless communications between a network and various nodes and devices, such as UEs. Such deployments may use beamformed transmissions in mmW frequency ranges for communications between different nodes, which may include access and backhaul communications. For instance, a parent node (which may also be referred to as a donor node, an anchor node, or other like terminology) may have a high-capacity, wired, backhaul connection (e.g., fiber) to a core network. The parent node may also communicate (e.g., using directional beams) with one or more other nodes (e.g., relay nodes or devices) and/or UEs that may be referred to as child nodes. As such, wireless communications between the parent node and other devices may include backhaul communications, access communications, or a combination thereof. Such systems may be referred to as an IAB network.

In deployments supporting both access and backhaul over wireless communication links (e.g., in an IAB network), a child node may rely on signaling (e.g., SSBs, CSI-RSs, or the like) to acquire beam information from potential IAB parent nodes. For instance, to acquire beam information, SSBs may be transmitted by one or more parent nodes in a certain time interval, and each SSB may be identified by a unique number referred to as an SSB index. Each SSB may be transmitted via a specific beam radiated in a respective direction, where one or more SSBs may be included within a synchronization signal burst. Other wireless devices (e.g., UEs and other nodes) located near the parent nodes may measure the signal strength of each SSB detected for a period of time, and the wireless devices may identify the SSB index with the strongest signal strength (where the strongest signal strength may correspond to the best beam for the wireless device relative to other beams used by the parent node). Likewise, a parent node may rely on signaling (e.g., SRSs transmitted in the uplink from child nodes for beam management and channel quality estimation.

However, conditions may exist that may cause interference, blockage, etc. of the beam carrying measurement signals, such as an SSB, which may result in a link failure. In these conditions, the ability of the child node to receive the SSB may be negatively impacted. For example, if the path between the parent node and the child node is blocked, the child node may be unable to rely on the SSB to re-acquire its parent node. As such, latency in the network (e.g., for nodes recovering from a link failure) may be based on the rate and/or frequency of SSB transmissions. In one example, a node that transmits SSBs more frequently may facilitate robust acquisition/re-acquisition opportunities for another node or UE. However, there also may be overhead associated with transmitting SSBs more often. As a result, there may be a tradeoff between signaling overhead and system stability and reliability.

As described herein, upon the detection of a beam or link failure, the child node and parent node may dynamically switch autonomously or synchronously to a different monitoring and transmission frequency modes. For example, a child node or a parent node, or a combination thereof, may monitor the link condition of a communication link between the child node and the parent node. In some examples, if one or both of the nodes determine that the link condition has fallen below a pre-defined threshold (e.g., as a result of decreased or poor link conditions from interference), then either or both nodes may attempt to signal the other node indicating the poor link condition. If the other node is able to receive the indication, then both nodes may synchronously switch to a different mode, enabling a relatively higher frequency for signal transmissions and monitoring.

Additionally or alternatively, if the nodes are unable to receive the indication (e.g., due to the link conditions), then the two nodes may autonomously switch to a different mode based on the link quality. For example, in a first mode, SSB transmissions and monitoring may occur with a first periodicity and more frequently than a second mode (e.g., where SSB monitoring and transmissions may occur according to a periodicity associated with link conditions that are greater than the threshold). There may also be any number of different modes that may be dynamically selected based on the current link condition. The flexible selection of different periodicities for signal transmissions and corresponding monitoring that may change dynamically according to link conditions may allow for increased reliability in the network, reduced latency (e.g., in acquiring or reacquiring a parent node), and reduced or minimized signaling overhead.

Aspects of the disclosure are initially described in the context of a wireless communications system. Specific examples are then described for synchronization signal periodicity adjustment in an IAB communication network. Aspects of the disclosure are further illustrated by and described with reference to apparatus diagrams, system diagrams, and flowcharts that relate to synchronization signal periodicity adjustment.

FIG. 1 illustrates an example of a wireless communications system 100 that supports synchronization signal periodicity adjustment in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices. Wireless communications system 100 may support the use of dynamically selected monitoring and transmission periodicities for measurement signals.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include access nodes to facilitate wireless communication between various wireless devices (such as UEs 115 and other access nodes or base stations 105) and the core network 130. For example, an anchor access node (or parent node) may have a high-capacity, wired (e.g., fiber), backhaul connection to the network, while communicating simultaneously with one or more other access nodes (e.g., base stations 105, relay devices, UEs 115), which may be referred to as child nodes. Due to a variety of conditions, the channel (or path) between the communicating devices may experience interference, blockage, etc., such that the wireless communications may degrade or fail. Such conditions may include adverse weather, temperature, barometric pressure, diffraction, physical objects, etc. These conditions may affect the ability of parent and child nodes to communicate over the channel.

However, as described herein, techniques may be used by various wireless devices within wireless communications system 100 to select different periodicities for monitoring for signaling transmitted by another wireless device, which may be based on the quality of the link between the devices. For instance, a first wireless device (e.g., a UE 115 or a base station 105) may use a particular monitoring periodicity to monitor for signals transmitted from another wireless device based on current link conditions. Upon determining that a link quality has changed (e.g., decreased or reached a threshold), the first wireless device may decrease its monitoring periodicity (e.g., increase a monitoring frequency) to attempt to detect signals transmitted by the other wireless device. Further, the other wireless device may likewise decrease its transmission periodicity (and increase a transmission frequency) of measurement signals (e.g., SSBs) due to the changed link quality in an attempt to assist the wireless device in detecting the transmitted signals. As a result, the increased monitoring and transmission periodicities may provide additional occasions for the wireless device to identify signals that facilitate efficient and stable communication links (e.g., measurement reporting, beam management) under various conditions. Additionally, should the condition of the link improve, the wireless devices may select a different transmissions and monitoring periodicity commensurate with the current link condition (e.g., a lower frequency in cases where the link quality is above a minimum threshold).

One or more of the UEs 115 may include a communications manager 101, which may determine a configuration of an actual transmission periodicity and at least one virtual transmission periodicity used by a parent node. In some cases, the communications manager 101 may determine a link condition of a communication link between the child node and the parent node. The communications manager 101 may select a monitoring periodicity corresponding to the actual transmission periodicity or a virtual transmission periodicity based on one or more parameters, and monitor for measurement signals transmitted by the parent node over the communication link in accordance with the selected monitoring periodicity. In some cases, the one or more parameters include the link condition.

One or more of the base stations 105 may include a communications manager 101, which may determine a configuration of an actual transmission periodicity and a virtual transmission periodicity. In some cases, the communications manager 101 may determine a link condition of a communication link between the parent node and a child node. The communications manager 101 may select a transmission periodicity corresponding to the actual transmission periodicity or the at least one virtual transmission periodicity based on one or more parameters, and transmit measurement signals to the child node over the communication link in accordance with the selected transmission periodicity. In some cases, the one or more parameters include the link condition.

The parent node may also communicate with a nearby node (e.g., neighboring node). The neighboring node may also include a communications manager 101, which may transmit measurement signals to wireless devices (e.g., child node, parent node, or combination thereof) in accordance with a transmission periodicity, receive, from a parent node, an indication to adjust the transmission periodicity to a virtual transmission periodicity based on one or more parameters of a communication link between the parent node and the wireless devices, and transmit the measurement signals to the wireless devices in accordance with the virtual transmission periodicity. In some cases, the one or more parameters include a link condition.

Figure 2:
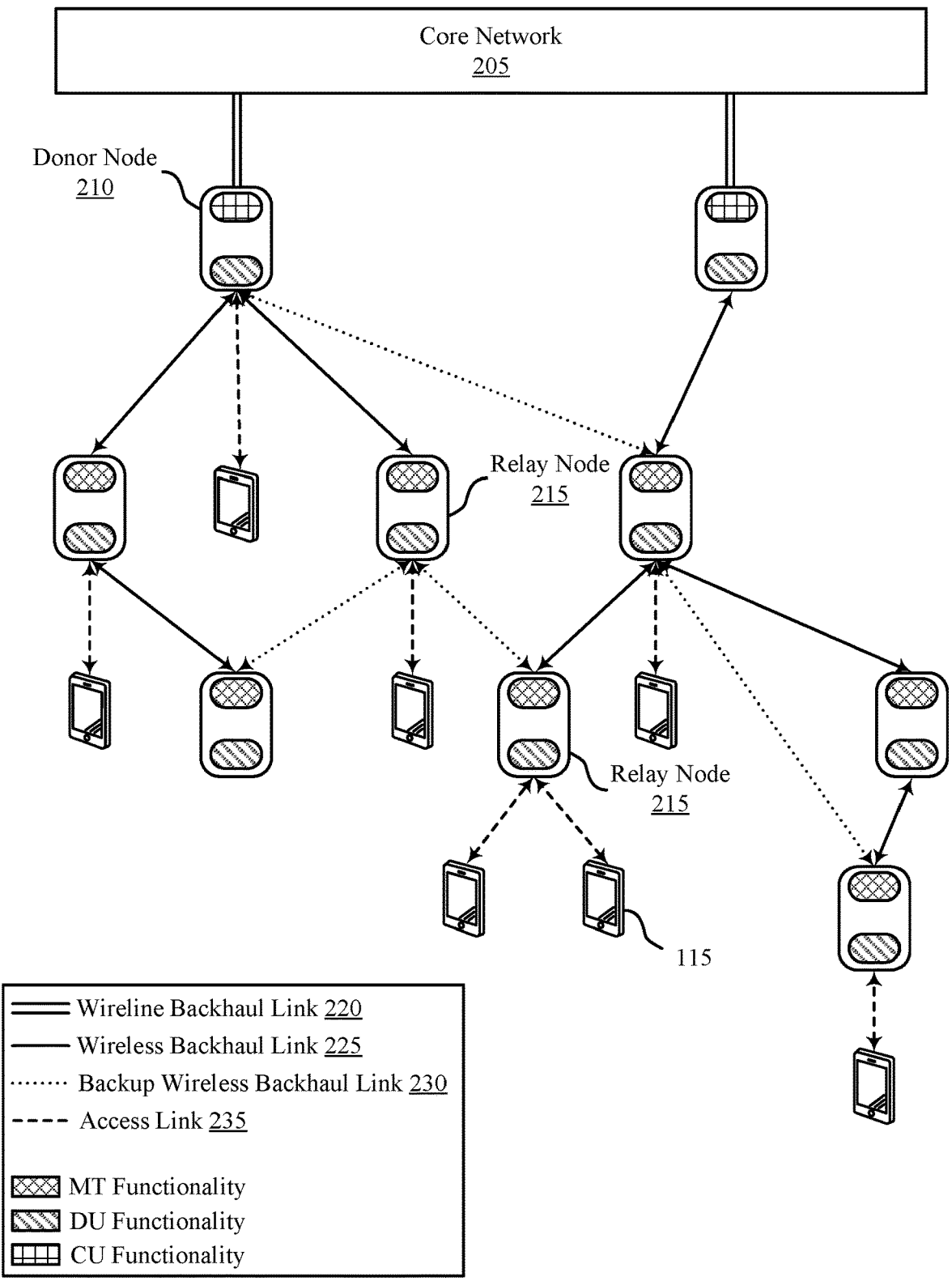
FIG. 2 illustrates an example of a wireless communications system that supports synchronization signal periodicity adjustment in accordance with one or more aspects of the present disclosure.

FIG. 2 illustrates an example of a wireless communications system 200 that supports synchronization signal periodicity adjustment in accordance with one or more aspects of the present disclosure. Wireless communications system 200 (which may be an example of an NR system that supports mmW communications) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Furthermore, CUs of IAB donor nodes 210 may communicate with the core network 205 over a wireline backhaul link 220 (e.g., which may be referred to as an NG interface). DUs may host lower layer operations, such as layer 1 (L1) and/or layer 2 (L2) (e.g., RLC, MAC, physical (PHY) layer) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g., via a backhaul link, such as a primary wireless backhaul link 225 or a backup wireless backhaul link 230).

IAB relay nodes 215 may be split into associated mobile terminal (MT) and base station DU entities, where MT functionality of the IAB relay nodes 215 may be controlled and/or scheduled by antecedent (i.e., parent) IAB nodes via wireless backhaul links. A parent node to a relay node 215 may be another (antecedent) relay node 215 or an IAB donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream and/or receiving information from a base station CU or the core network 205. In some cases, an IAB relay node 215 may additionally include one or more backup wireless backhaul links 230 (e.g., for redundant connectivity and/or improved robustness). If the primary wireless backhaul link 225 fails (e.g., due to interference, malfunction at a connected IAB node, movement of IAB nodes, maintenance at IAB nodes), an IAB relay node 215 may utilize a backup wireless backhaul link 230 for backhaul communication within the IAB network.

The first (e.g., primary) wireless backhaul link 225 may be associated with a coverage area and MT functionality may be controlled and/or scheduled by a first parent node. The one or more secondary backhaul links (e.g., backup wireless backhaul links 230) may be associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115) in both communication directions based on established backhaul and access connections. It should be noted that the various devices in wireless communications system 200 may act as parent nodes, child nodes, or both based on the system architecture, and these roles may change dynamically for each device.

In some cases, wireless devices (e.g., IAB nodes) may operate in one of more pathloss modes such as a high pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 200 over a radio frequency spectrum band. In some aspects, this may include the wireless device(s) operating in a first pathloss mode (e.g., a low pathloss mode or normal mode) in the wireless communications system 200.

The wireless device(s) may receive a signal that indicates that the pathloss value has satisfied (or exceeded) a threshold pathloss value. As one example, the wireless device(s) may monitor a channel of the radio frequency spectrum band (e.g., monitor signals being communicated over the channel) and determine that the pathloss value has satisfied (or exceeded) the threshold pathloss value. In another example, the wireless device(s) may receive a signal from another wireless device indicating that the pathloss value has satisfied (or exceeded) the threshold pathloss value. Accordingly, the wireless device(s) may switch from the first pathloss mode (e.g., a low pathloss mode) to a second pathloss mode (e.g., high pathloss mode) and continue to perform wireless communications. The second pathloss mode (e.g., the high pathloss mode) may include one or more parameters to support continued wireless communications in the high pathloss environment. Examples of the parameters that may be adjusted may include, but are not limited to, the length of the SSB in the high pathloss mode being longer, the length of a reference signal in the high pathloss mode being longer, a modulation and coding scheme (MCS) in the high pathloss mode being lower, and the like. Accordingly, the wireless devices may continue to perform wireless communications in the wireless communications system 200 in the high pathloss environment according to the second pathloss mode (e.g., the high pathloss mode).

A UE 115 or relay node 215 may rely on an SSB to acquire beam information from a current or potential parent node, such as a donor node 210 or a relay node 215. An SSB may consist of a primary synchronization signal (PSS), a secondary synchronization signal (SSS), and/or broadcast information (e.g., a physical broadcast channel (PBCH)). To acquire beam information, multiple SSBs may be transmitted by one or more parent nodes (e.g., over wireless backhaul links 225 or over access links 235) in some time interval, and each SSB may be identified by a unique number referred to as an SSB index. Each SSB may be transmitted via a specific beam radiated in a certain direction, where one or more SSBs may be included within a synchronization signal burst. Other wireless devices (e.g., UEs 115 and other nodes) located around the parent nodes may measure the signal strength of each SSB detected for a certain period and the wireless devices may identify the SSB index with the strongest signal strength (where the strongest signal strength may correspond to the most ideal beam for the wireless device relative to other beams used by the parent node).

In some cases, an access link 235 (e.g., between a donor node 210, relay node 215, UE 115, or a combination thereof) or a wireless backhaul link 225 carrying an SSB may be negatively impacted due to interference, blockage, etc. In these conditions, the ability of a UE 115 or relay node 215 to receive SSB transmissions may be affected, which may cause latency in the network, increased overhead, and decreased network reliability. Therefore, a relay node 215, UE 115, donor node 210, or a combination thereof, may monitor the access link 235 condition (or wireless backhaul link 225 condition) between itself and another node or UE 115. If any of the nodes determine that the link condition has fallen below a threshold (e.g., a predetermined threshold), then any or all nodes may attempt to signal the other nodes or UEs 115 indicating the poor link condition. If the other nodes or UEs 115 are able to receive the indication, then the nodes may synchronously switch to a different mode. If the other nodes or UEs 115 are unable to receive the indication, then the nodes may autonomously switch to a different mode. For example, in a different mode, SSB transmissions and monitoring may occur more frequently. There also may be any number of different modes that may be dynamically selected based on the current link condition. The increased frequency of SSB transmission that may change dynamically according to link conditions may allow for increased reliability in the network, latency may be reduced, and overhead may be minimized.

Figure 3:
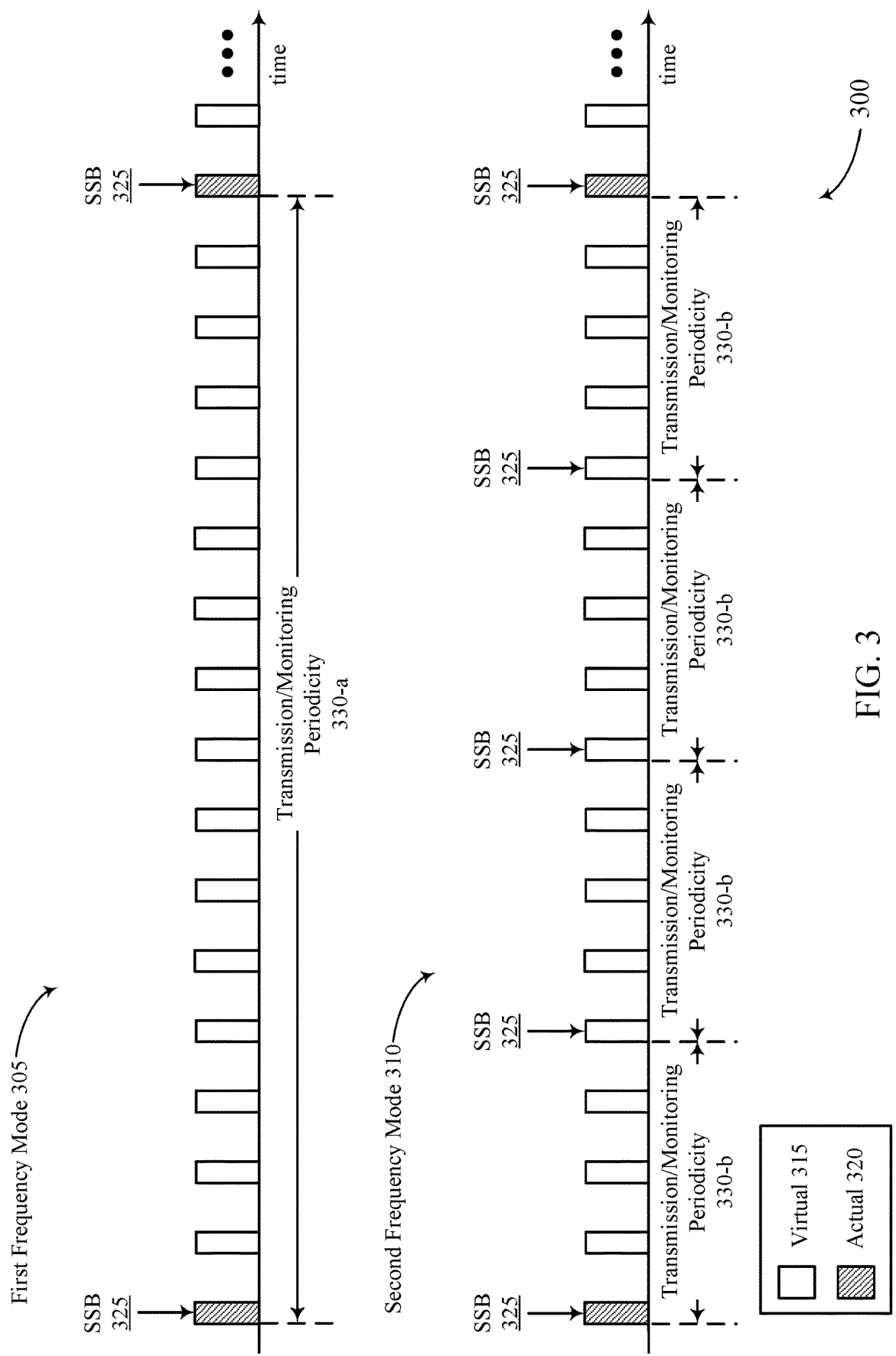
FIG. 3 illustrates an example of transmission/monitoring modes that support synchronization signal periodicity adjustment in accordance with one or more aspects of the present disclosure.

FIG. 3 illustrates an example of transmission/monitoring modes 300 that support synchronization signal periodicity adjustment in accordance with one or more aspects of the present disclosure. In some examples, the transmission/monitoring modes 300 may implement aspects of wireless communications system 100. The transmission/monitoring modes 300 may include a first frequency mode 305 and second frequency mode 310. Each frequency mode 305 and 310 may include a number of virtual instances 315 and actual instances 320, which may correspond to the transmission of an SSB 325 (e.g., during a TTI). A virtual transmission periodicity may refer to a period of time between virtual instances 315 of a signal, and an actual transmission periodicity may refer to a period of time between actual instances 320 of a signal.

In some cases, first frequency mode 305 may correspond to a first transmission/monitoring periodicity 330-a (e.g., in accordance with an actual transmission periodicity), and second frequency mode 310 may correspond to a second transmission/monitoring periodicity 330-b (e.g., in accordance with a virtual transmission periodicity) that is shorter than (e.g., higher frequency than) the first transmission/monitoring periodicity 330-a. As illustrated, a virtual transmission periodicity may have a higher frequency than an actual transmission periodicity. However, the virtual instances 315 and the actual instances 320, as well as the virtual and actual periodicities, may be different than what is illustrated.

The first frequency mode 305 and second frequency mode 310 may be examples of modes enabling different periodicities used for communication in an IAB network between donor nodes 210, relay nodes 215, UEs 115, or a combination thereof as described in FIG. 2. As described herein, donor nodes 210 may be referred to as parent nodes and relay nodes 215 may be referred to as child nodes. In some cases, nodes and UEs 115 in an IAB network may rely on an SSB 325 transmitted from a current or potential parent node to acquire beam information. However, these nodes may experience blocking, interference, or a combination thereof that may inhibit the nodes from receiving SSB 325 reliably.

In these cases, the frequency of SSB 325 transmission and monitoring may be a dynamic parameter such that, when connectivity is poor between a child and parent node, the SSB 325 may be transmitted more frequently. Similarly, when connectivity is not affected by interference, or when the connection quality returns to a certain threshold, the SSB 325 transmission frequency may decrease to a base level or first frequency mode 35. There may be several different SSB 325 transmission frequencies that may be implemented under various network conditions. For example, under non-adverse conditions, the SSB 325 may be transmitted at a low frequency or not at all, while under slightly adverse conditions, the SSB 325 may be transmitted at a slightly higher frequency, and under extremely adverse conditions, the SSB 325 may be transmitted at a high frequency. Different thresholds for various levels of adverse conditions may be pre-configured and paired with different SSB 325 transmission frequencies.

The frequency adjustment from a first frequency mode 305 to a second frequency mode 310 (and back to the first frequency mode 305) may be dynamic such that there may be any number of modes used to adjust the link conditions and detected errors present. For example, a first frequency mode 305 may be a lower frequency mode (e.g., utilizing the first transmission/monitoring periodicity 330-a) that is used when less adverse conditions are present, and a second frequency mode 310 may be a high frequency mode (e.g., utilizing the second transmission/monitoring periodicity 330-b that is shorter than first transmission/monitoring periodicity 330-*a*) that may be used when strongly adverse conditions are present. There may also be any of number of modes in between the first and second frequency to be used dependent on the current conditions of the connection between the parent node and child node. Similarly, a wireless device may transmit and/or monitor for signals in every virtual instance 315 (e.g., using a respective mode). In some cases, the child node and parent node may also use signaling other than an SSB 325, such as a CSI-RS, as one example. In some cases, the child node may transmit an SRS or other signaling on the uplink to the parent node in accordance with the first frequency mode or the second frequency mode (and their respective periodicities 330).

In some implementations, the parent node and the child node may agree upon the timing and frequency of actual instances 320 and virtual instances 315. An actual instance 320 may correspond to resources allocated for the transmission and reception of data signaling, and may occur less frequently than virtual instances 315 that may be resources allocated for the transmission and reception of an SSB in adverse conditions. In some cases, this agreement may extend to other nodes or UEs 115 in the network. The agreement may be made upon setup of the connection between the child node and parent node and may be based on exchange of capabilities or monitoring requirements between the nodes, or there may be a particular configuration supported by both nodes that is known prior to enabling a high-pathloss mode. Under non-adverse conditions the parent node may transmit in the actual instances 320 and the child node may monitor the actual instances 320. If the parent node detects poor link quality, the parent node may switch to transmitting in the virtual instances 315 that occur more often than the actual instances 320. If the child node detects poor link quality, the child node may switch to monitoring the virtual instances 315.

Either a child node or a parent node may detect a beam or link failure. This detection may be based on error rate, lack of receiving acknowledgments (ACKs) (or increased reception of negative acknowledgments (NACKs)), measurements performed based on SSBs to determine radio link failure, low reference signal received power (RSRP), failure to decode a channel due to signal quality, lower than expected signal to interference-plus-noise ratio (SINR) or signal to noise ratio (SNR), or the like. In one example, the parent node may receive a high number of NACKs from the child node, indicating that there may be a poor connection between the child node and parent node. In some cases, there may be a pre-determined threshold for the number of NACKs that may be received by the parent node before changing SSB 325 transmission frequencies. Likewise, there may be a threshold for the number of NACKs transmitted by the child node before the child node switches to a second frequency mode 310.

In another example, between the SSBs 325, the child node and parent node may transmit and receive data during the actual instances 320 and the two nodes may measure an error rate during the actual instances 320. One or both of the nodes may conclude that the error rate has increased out of a pre-determined range and may conclude that poor link quality exists. Upon the detection of beam or link failure, the node may switch to a different SSB frequency mode. In some implementations, the node that first detects the poor connection may transmit a signal to the other node indicating there is a poor connection, that the node is switching modes, or a combination thereof. For example, the parent node may transmit data to the child node, and the child node may recognize that there is a problem with the link and adjust a monitoring periodicity. As such, the child node may transmit one or more NACKs to the parent node. If the parent node is able to receive the one or more NACKs, the parent nodes may also transition to the higher frequency mode for transmitting SSBs 325.

In other cases, the parent node may detect the poor link quality before the child node. The parent node may indicate, to the child node, that the parent node is switching modes. The parent node may then switch modes and transmit an SSB 325 more frequently. In some cases, the parent node may switch modes without transmitting an indication to the child node. The child node may switch modes upon receiving SSBs 325 at the higher frequency, upon receiving an indication from the parent node that the parent node is switching modes, or a combination thereof. In some cases, the child node may monitor every virtual instance 315 and actual instance 320 independent of the mode the parent node is in. In some cases, the parent node may only transmit an SSB 325 when there is a poor link condition between parent and child nodes.

In some examples, the child node may not receive transmissions from the parent node or may recognize the link quality is poor, switch its monitoring periodicity 330, and stop transmitting ACKs and NACKs. In this case, the child node may be monitoring at a high frequency (e.g., using the second transmission/monitoring periodicity 330-*b*) and the parent node may be transmitting at the first frequency mode 305 (e.g., using the first transmissions/monitoring periodicity 330-*a*). For a period of time, the child node and parent mode may be out of sync such that one node is in a first frequency mode 305 and the other is in a higher or second frequency mode 310. For example, the child node may switch to a second frequency mode 310 and may not receive the SSB 325 in a time frame the child node is expecting because the parent node has not switched modes and/or periodicities yet.

In some cases, the child node may utilize a timer that starts when the child node switches to the second frequency mode 310. When the timer is running, the child node may continue to monitor for the SSB 325 from the parent node to account for the time it may take for the parent node to realize poor link quality exists and to switch modes. There may also be a timer that the parent node utilizes such that, if the parent node has not received an ACK or a NACK from the child node in a certain time period, the parent node may switch to a second frequency mode 310 upon expiration of the timer. Mode switching at the parent node or child node may be autonomous if the detection of the poor link quality is not synchronous between the nodes, such as in the case previously described. The parent node and child node may also autonomously or synchronously switch back to a first frequency mode 305 when the link quality returns. In any case, the flexibility for the various nodes to switch between transmission and monitoring periodicities may account for a variety of conditions that a communications link may experience, enabling both synchronous and asynchronous behavior, while also facilitating fast or delayed switching that may be dynamically based on the link conditions.

In some implementations, all beams between the parent node and child node may be blocked. In this case, the parent node may indicate to one or more other IAB nodes near the parent node (e.g., neighboring nodes) to increase their SSB transmission frequency. The parent node may transmit this indication immediately after switching modes, after a certain number of attempts to communicate with the child node, as soon as a link condition threshold is satisfied, after an amount of time after detecting poor link quality, or a combination thereof. The parent node may also signal neighboring nodes if the parent node does not have the capability to transmit SSB 325 at a higher frequency. For example, the parent node may not have enough resources available to accommodate the higher transmission frequency.

In some cases, the child node may be able to monitor SSB 325 transmissions from multiple nodes and may be able to receive an SSB 325 from its parent node, a neighboring node, or a combination thereof. If the child node receives an SSB 325 from a node that is not its parent, and does not receive an SSB 325 from the parent node, then the child node may switch to the neighboring node. If the child node receives an SSB 325 from both a parent and neighboring node then the child node may continue to communicate with the parent node or may switch to the neighboring node. The neighboring nodes that may be indicated to switch transmission frequencies and the different transmission frequency rates may be pre-configured or may be determined on-demand. Through the increased frequency of signals sent by neighboring nodes, a child node may be able to receive beam management signaling (or other signaling) despite decreased link quality or a link failure with a parent node, enabling robust communications within the system.

In some examples, such as when the communication link(s) between the parent and child node decrease in quality or fail, timing information may also be transmitted to one or more neighboring nodes. For instance, while the parent node and child nodes are able to communicate over a communication link and receive SSBs 325 (e.g., with varying periodicities 330, as described herein), both the parent and the child node may operate using synchronous communications. More specifically, when monitoring for a signal from the parent node, a child node may know when a signal is transmitted by the parent node (and vice versa). However, should the condition of a communication link degrade, synchronization may be lost between the nodes. As a result, the parent node may transmit, to one or more neighboring nodes, timing information (e.g., symbol timing information) used for communicating with the child node. As described above, the neighboring node(s) may receive a request from the parent node to transmit measurement signals, and may also be provided with the symbol timing information from the parent node. As such, the measurement signals may be transmitted by a neighboring node to the child node in accordance with the symbol timing information, and the child node may monitor for the measurement signal using the same symbol timing. That is, the parent node may provide its symbol timing information to the neighboring node so that the neighboring node may transmit signals at or near the symbol time that the child node will be monitoring for signals, thereby enabling continuous synchronized communication.

Figure 4:
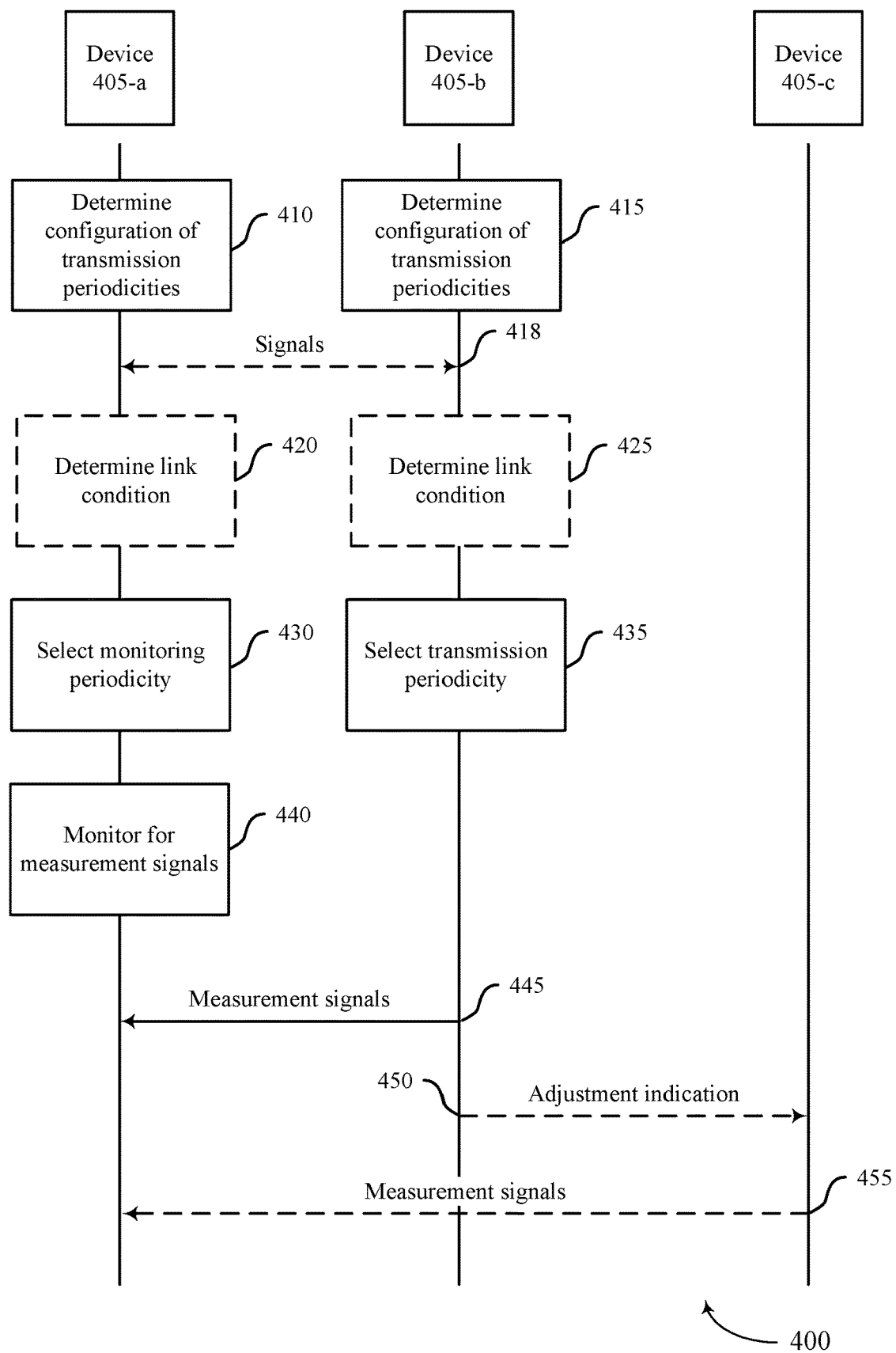
FIG. 4 illustrates an example of a process flow in a system that supports synchronization signal periodicity adjustment in accordance with one or more aspects of the present disclosure.

FIG. 4 illustrates an example of a process flow 400 in a system that supports synchronization signal periodicity adjustment in accordance with one or more aspects of the present disclosure. In some examples, process flow 400 may implement aspects of wireless communications system 100 and 200. For example, device 405-*a*, 405-*b*, and 405-*c* may be examples of wireless devices in an IAB network. Accordingly, devices 405 may be examples of nodes, UEs 115, base stations 105, or like devices as described with reference to FIGS. 1 and 2. Alternative examples of the following may be implemented, where some operations are performed in a different order than described or are not performed at all. In some cases, operations may include additional features not mentioned below, or further operations may be added.

At 410, device 405-*a* may determine a configuration of transmission periodicities. The transmission periodicities may include an actual transmission periodicity and at least one virtual transmission periodicity used by device 405-*b*. At 415, device 405-*b* may determine a configuration of transmission periodicities. Accordingly, the transmission periodicities may include the actual transmission periodicity and the at least one virtual transmission periodicity. As described herein, the actual transmission periodicity may correspond to a first periodicity of signals, whereas the virtual transmission periodicity may correspond to a second periodicity that is shorter than (i.e., more frequent than) the first periodicity. Device 405-*a* or device 405-*b* may agree upon the timing and frequency of actual periodicities and virtual periodicities. This agreement may extend to other devices or UEs 115 in the network. In some examples, the identification of the periodicities may be made upon setup of the connection between device 405-*a* and device 405-*b* and may be based on exchange of capabilities or monitoring requirements between the devices. Additionally or alternatively, there may be a particular configuration supported by both devices that is known or predetermined.

At 418, device 405-*a* and device 405-*b* may exchange signals to determine link quality between the devices. For example, the link quality may be determined by RSRP, RSRQ, SINR, other measurements, or a combination thereof. In some cases, at 420, device 405-*a* may determine a link condition of a communication link between device 405-*a* and device 405-*b*, which may be based on the signaling at 418. In some cases, similarly, at 425, device 405-*b* may determine a link condition of a communication link between device 405-*a* and device 405-*b*.

At 430, device 405-*a* may select a monitoring periodicity corresponding to the actual transmission periodicity or the at least one virtual transmission periodicity based on one or more parameters. Similarly, at 435, device 405-*b* may select a transmission periodicity corresponding to the actual transmission periodicity or the at least one virtual transmission periodicity based on one or more parameters. In some cases, the one or more parameters include a link condition. In one example, either or both or the devices may determine the link condition is poor, and device 405-*a* may select a monitoring periodicity corresponding to the at least one virtual transmission periodicity and device 405-*b* may transmission periodicity corresponding to the at least one virtual transmission periodicity. In such cases, device 405-*a* and device 405-*b* may detect a beam or link failure at similar or different times. The detection of the link quality and the adjustment of periodicities may be based on an error rate, lack of receiving ACKs (or increased reception of NACKs), measurements performed based on SSBs to determine radio link failure, low RSRP, failure to decode a channel due to signal quality, lower than expected SINR or SNR, or the like.

In another example, either or both of the devices may determine that the link condition is favorable, and the devices may select monitoring and transmission periodicities corresponding to the actual transmission periodicities. The selection of monitoring and transmitting periodicities may be performed by device 405-*a* and 405-*b* in a synchronous manner such that the selection was determined based on both devices and occurs at the same time. The selection may also be made in an autonomous manner such that devices perform the selection without considering the other device, where the selections by the two devices may be performed at different times.

At 440, device 405-*a* may monitor for one or more measurement signals transmitted by device 405-*b*, 405-*c*, or a combination thereof, over the communication link in accordance with the selected monitoring periodicity. For instance, at 445, device 405-*b* may transmit measurement signals to device 405-*a* over the communication link in accordance with the selected transmission periodicity, where the selected transmission periodicity may be based on the current link condition between device 405-*a* and 405-*b*. In one example, if device 405-*a* and 405-*b* were able to synchronously detect a poor link condition then device 405-*a* may be monitoring at a periodicity that matches the transmission periodicity of device 405-*b*. In another example, device 405-*a* and 405-*b* be not be coordinated due to adverse conditions, and device 405-*a* may be monitoring at a different periodicity than device 405-*b* is transmitting. Device 405-*b* may be transmitting at a periodicity that is less than, matches, or is greater than the periodicity at which device 405-*a* is monitoring at.

In some cases, all beams between device 405-*a* and device 405-*b* may be blocked resulting in total link failure. In this case, device 405-*b* may indicate to other nodes near device 405-*b* (e.g., device 405-*c*) to increase their transmission frequency. In such cases, at 450, device 405-*c* may receive, from device 405-*b*, an indication to adjust the transmission periodicity to at least one virtual transmission periodicity based on a link condition of a communication link between device 405-*a* and device 405-*b*. Device 405-*b* may transmit this indication immediately after switching modes, after a certain number of attempts to communicate with device 405-*a*, or after a certain amount of time after detecting poor link quality, or a combination thereof. Device 405-*b* may also signal neighboring nodes if device 405-*b* does not have the capability to transmit at a higher frequency. For example, device 405-*b* may not have enough resources available to accommodate the higher transmission frequency.

Additionally or alternatively, device 405-*b* may determine a priority of data to be sent to various nodes and devices within the system, and device 405-*b* may determine that the priority of the measurement signals to device 405-*a* may be of lower priority. Thus, device 405-*b* may refrain from modifying its transmission periodicity of measurement signals based on other, higher priority, transmissions. As such, device 405-*b* may signal to device 405-*c* to adjust the transmission periodicity of device 405-*c*. Device 405-*b* may also include symbol timing information in the adjustment indication 450 to device 405-*c*. For instance, the symbol timing information may be timing information that corresponds to the synchronized clocks of device 405-*b* and device 405-*a*. In cases where the link or links between device 405-*a* and device 405-*b* fail, there may be a period of time before respective clocks at the two device drift out of synchronization (e.g., due to the lack of synchronization information or other signaling between the devices). Accordingly, the timing information provided by device 405-*b* to device 405-*c* may enable device 405-*c* to determine the timing of measurement signals expected by device 405-*a*.

At 455, device 405-*c* may transmit measurement signals to device 405-*a* in accordance with the at least one virtual transmission periodicity. In some cases, device 405-*c* may utilize the symbol timing information provided by device 405-*b* to transmit measurement signals during or near the symbol time that device 405-*a* will be monitoring for measurement signals. In some cases, device 405-*a* may be able to monitor transmissions from multiple nodes (e.g., device 405-*b* and device 405-*c*) and may be able to receive a transmission from device 405-*b*, device 405-*c*, or a combination thereof. If device 405-*a* receives a transmission from device 405-*b*, and does not receive a transmission from device 405-*c*, then device 405-*a* may be able to switch to device 405-*c* that is not being blocked. If device 405-*a* receives a transmission from both device 405-*b* and 405-*c* then the device 405-*a* may continue to communicate with device 405-*b* or may switch to device 405-*c*. Devices such as device 405-*c* that may be indicated to switch transmission frequencies and the different transmission rates may be pre-configured or may be determined on-demand.

Figure 5:
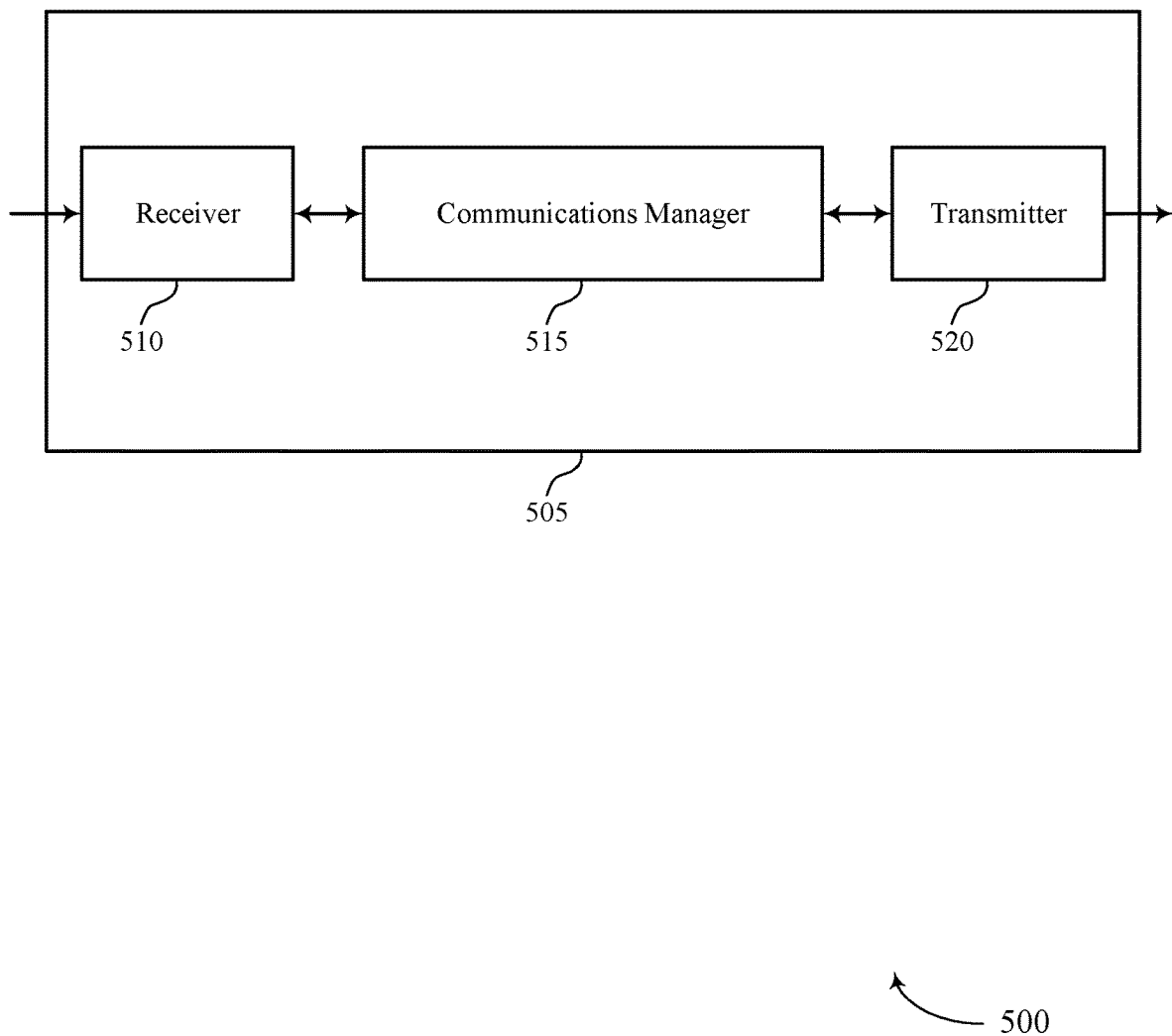
FIGS. 5 and 6 show block diagrams of devices that support synchronization signal periodicity adjustment in accordance with one or more aspects of the present disclosure.

FIG. 5 shows a block diagram 500 of a device 505 that supports synchronization signal periodicity adjustment in accordance with one or more aspects of the present disclosure. The device 505 may be an example of aspects of a wireless device, such as a UE 115, base station 105, or access node, as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to synchronization signal periodicity adjustment). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may determine a configuration of an actual transmission periodicity and at least one virtual transmission periodicity used by a second device, select a monitoring periodicity corresponding to the actual transmission periodicity or the at least one virtual transmission periodicity based on one or more parameters, and monitor for one or more measurement signals transmitted by the second device over a communication link in accordance with the selected monitoring periodicity.

The communications manager 515 may also determine a configuration of an actual transmission periodicity and at least one virtual transmission periodicity, select a transmission periodicity corresponding to the actual transmission periodicity or the at least one virtual transmission periodicity based on one or more parameters, and transmit one or more measurement signals to a second device over a communication link in accordance with the selected transmission periodicity.

The communications manager 515 may also transmit one or more measurement signals to a first set of one or more devices in accordance with a transmission periodicity, receive, from a second device, an indication to adjust the transmission periodicity to at least one virtual transmission periodicity based on one or more parameters of a communication link between the second device and the one or more devices, and transmit the one or more measurement signals to a second set of one or more devices in accordance with the at least one virtual transmission periodicity. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

In one or more aspects, the communications manager 515 as described herein may support improvements in SSB monitoring and transmission. One implementation may allow the device 505 to more flexibly select different periodicities for signal transmission and corresponding monitoring of the signal transmissions. For example, the device 505 may select different periodicities for signal transmissions and corresponding monitoring dynamically according to link conditions.

Based on implementing the SSB monitoring and transmissions techniques as described herein, a processor of a UE 115 (e.g., controlling the receiver 510, the transmitter 520, or the transceiver 820 as described with reference to FIG. 8) may increase reliability, mitigate signaling overhead, and reduce latency in the network because periodicities for signal transmissions may be flexibly selected.

Figure 6:
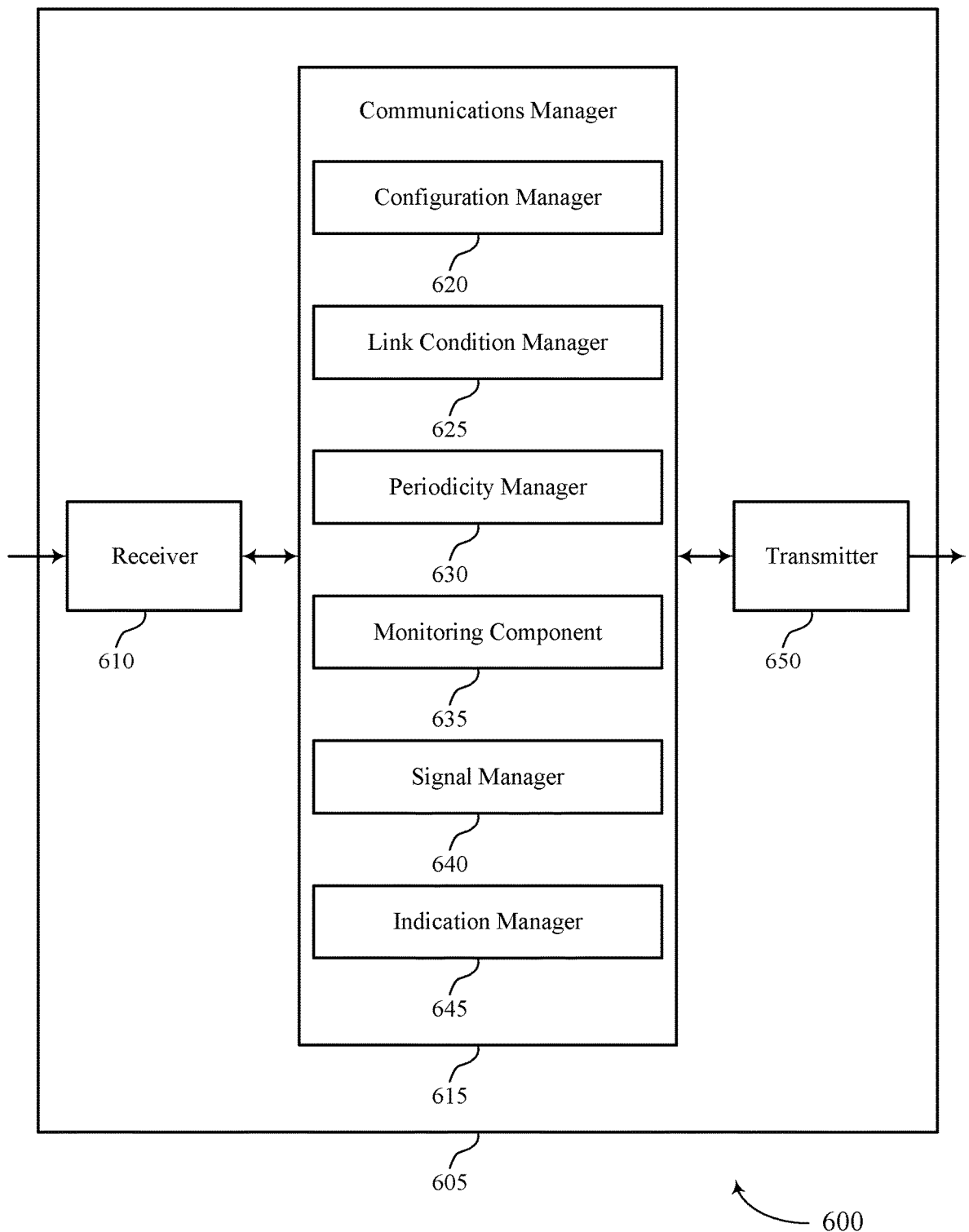

FIG. 6 shows a block diagram 600 of a device 605 that supports synchronization signal periodicity adjustment in accordance with one or more aspects of the present disclosure. The device 605 may be an example of aspects of a device 505, a UE 115, or a base station 105 as described herein. The device 605 may include a receiver 610, a communications manager 615, and a transmitter 650. The device 605 may also include a processor. Each of these components may be in communication with one another (e.g., via one or more buses).

Receiver 610 may receive information such as packets, user data, or control information associated with various information channels (e.g., control channels, data channels, and information related to synchronization signal periodicity adjustment). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a configuration manager 620, a link condition manager 625, a periodicity manager 630, a monitoring component 635, a signal manager 640, and an indication manager 645. The communications manager 615 may be an example of aspects of the communications manager 810 or 910 as described herein.

The configuration manager 620 may determine a configuration of an actual transmission periodicity and at least one virtual transmission periodicity used by a second device. The configuration manager 620 may determine a configuration of an actual transmission periodicity and at least one virtual transmission periodicity.

In some cases, the link condition manager 625 may determine a link condition of a communication link between the first device and the second device. The link condition manager 625 may determine a link condition of a communication link between the first device and a second device.

The periodicity manager 630 may select a monitoring periodicity corresponding to the actual transmission periodicity or the at least one virtual transmission periodicity based on one or more parameters. The periodicity manager 630 may select a transmission periodicity corresponding to the actual transmission periodicity or the at least one virtual transmission periodicity based on one or more parameters. In some cases, the one or more parameters may include a link condition. The monitoring component 635 may monitor for one or more measurement signals transmitted by the second device over a communication link in accordance with the selected monitoring periodicity.

The signal manager 640 may transmit one or more measurement signals to the second device over the communication link in accordance with the selected transmission periodicity. The indication manager 645 may receive, from a second device, an indication to adjust the transmission periodicity to at least one virtual transmission periodicity based on one or more parameters of a communication link between the second device and a second set of one or more devices. The signal manager 640 may transmit one or more measurement signals to a first set of one or more devices in accordance with a transmission periodicity and transmit the one or more measurement signals to the second set of one or more devices in accordance with the at least one virtual transmission periodicity.

Transmitter 650 may transmit signals generated by other components of the device 605. In some examples, the transmitter 650 may be collocated with a receiver 610 in a transceiver module. For example, the transmitter 650 may be an example of aspects of the transceiver 820 or 920 as described with reference to FIGS. 8 and 9. The transmitter 650 may utilize a single antenna or a set of antennas.

Figure 7:
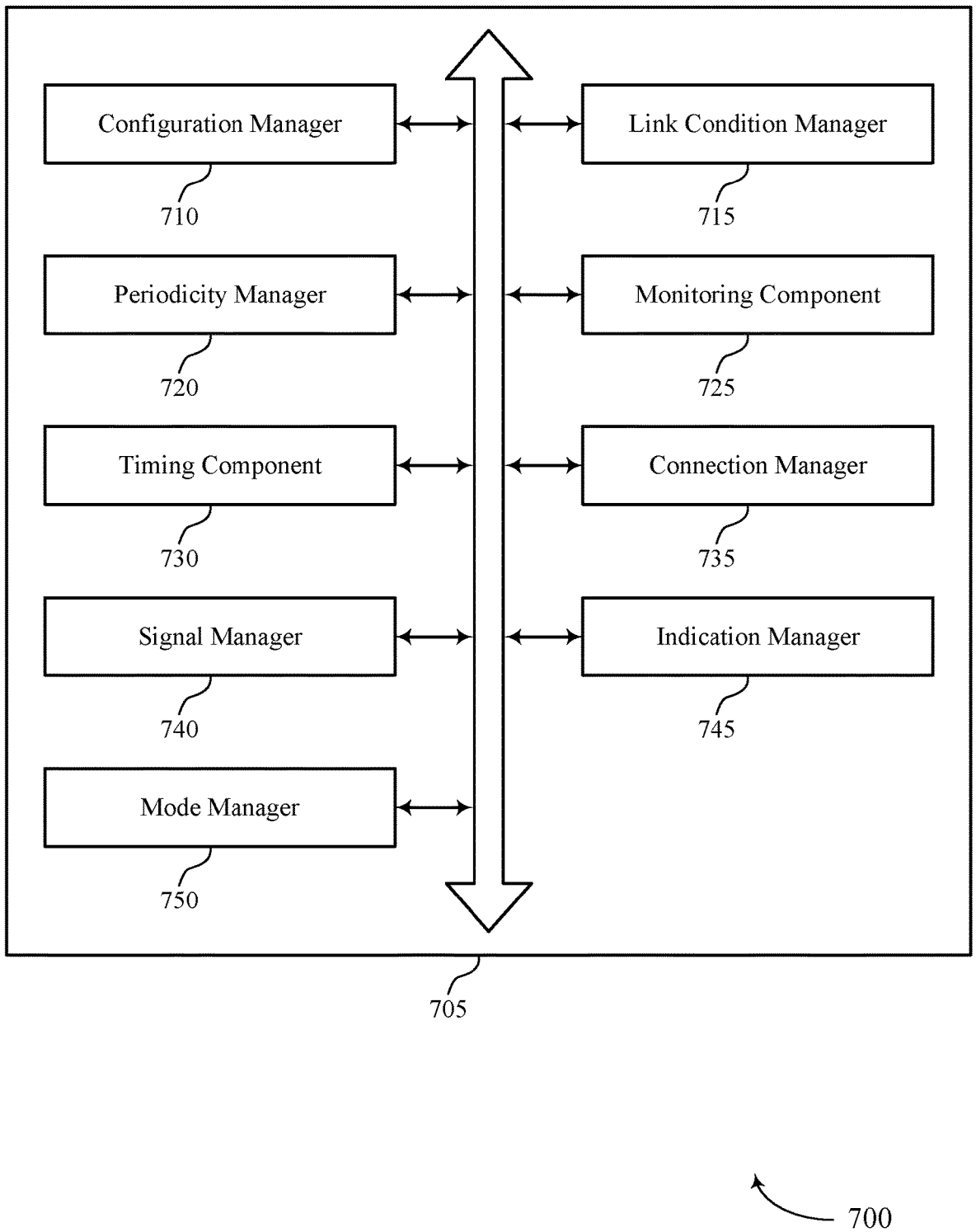
FIG. 7 shows a block diagram of a communications manager that supports synchronization signal periodicity adjustment in accordance with one or more aspects of the present disclosure.

FIG. 7 shows a block diagram 700 of a communications manager 705 that supports synchronization signal periodicity adjustment in accordance with one or more aspects of the present disclosure. The communications manager 705 may be an example of aspects of a communications manager 515, a communications manager 615, or a communications manager 810 described herein. The communications manager 705 may include a configuration manager 710, a link condition manager 715, a periodicity manager 720, a monitoring component 725, a timing component 730, a connection manager 735, a signal manager 740, an indication manager 745, and a mode manager 750. Each of these modules may communicate, directly or indirectly, with one another (e.g., via one or more buses).

The configuration manager 710 may determine a configuration of an actual transmission periodicity and at least one virtual transmission periodicity used by a second device. In some cases, the link condition manager 715 may determine a link condition of a communication link between the first device and the second device. The periodicity manager 720 may select a monitoring periodicity corresponding to the actual transmission periodicity or the at least one virtual transmission periodicity based on one or more parameters. In some cases, the one or more parameters include a link condition. The monitoring component 725 may monitor for one or more measurement signals transmitted by the second device over the communication link in accordance with the selected monitoring periodicity.

In some examples, the periodicity manager 720 may select the monitoring periodicity to correspond to the actual transmission periodicity. In some examples, the link condition manager 715 may determine that the link condition satisfies a threshold. In some examples, the periodicity manager 720 may adjust the monitoring periodicity to correspond to the at least one virtual transmission periodicity based on the link condition satisfying the threshold, the at least one virtual transmission periodicity being shorter than the actual transmission periodicity.

In some examples, the link condition manager 715 may determine that the link condition satisfies a second threshold. In some examples, the periodicity manager 720 may adjust the monitoring periodicity to correspond to the actual transmission periodicity based on the link condition satisfying the second threshold.

In some examples, the link condition manager 715 may determine that the communication link has failed based on the link condition. The connection manager 735 may establish a connection with one or more other devices based on the failed communication link. In some examples, the signal manager 740 may receive the one or more measurement signals from the one or more other devices.

In some examples, the indication manager 745 may receive an indication that the second device is transmitting the one or more measurement signals in accordance with the at least one virtual transmission periodicity. In some examples, the periodicity manager 720 may select the monitoring periodicity to correspond to the at least one virtual transmission periodicity based on the indication.

In some examples, the periodicity manager 720 may select the monitoring periodicity to correspond to the at least one virtual transmission periodicity based on the link condition. In some examples, the indication manager 745 may transmit, to the second device, an indication that the monitoring periodicity corresponds to the at least one virtual transmission periodicity.

The mode manager 750 may operate in a first monitoring mode associated with the actual transmission periodicity. In some examples, the mode manager 750 may operate in a second monitoring mode associated with the at least one virtual transmission periodicity.

In some examples, the indication manager 745 may receive an indication of the configuration via RRC signaling. In some examples, the signal manager 740 may receive the one or more measurement signals from the second device based on the monitoring. In some cases, the one or more measurement signals include SSBs, or CSI-RSs, or SRSs, or a combination thereof.

In some cases, the link condition includes an error rate for information transmitted over the communication link. In some cases, the communication link includes one or more directional beams operating over a mmW radio frequency spectrum band. In some cases, the first device includes a first node in an IAB network, and the second device includes a second node in the IAB network.

In some examples, the configuration manager 710 may determine a configuration of an actual transmission periodicity and at least one virtual transmission periodicity. In some examples, the link condition manager 715 may determine a link condition of a communication link between the first device and a second device. In some examples, the periodicity manager 720 may select a transmission periodicity corresponding to the actual transmission periodicity or the at least one virtual transmission periodicity based on one or more parameters. In some cases, the one or more parameters include a link condition. The signal manager 740 may transmit one or more measurement signals to a second device over the communication link in accordance with the selected transmission periodicity.

In some examples, the periodicity manager 720 may select the transmission periodicity to correspond to the actual transmission periodicity. In some examples, the link condition manager 715 may determine that the link condition satisfies a threshold. In some examples, the periodicity manager 720 may adjust the transmission periodicity to correspond to the at least one virtual transmission periodicity based on the link condition satisfying the threshold, the at least one virtual transmission periodicity being shorter than the actual transmission periodicity.

The timing component 730 may start a timer based on adjusting the monitoring periodicity to correspond to the at least one virtual transmission periodicity. In some examples, the timing component 730 may determine that the timer has expired. In some examples, the indication manager 745 may transmit, to one or more other devices, an indication to transmit the one or more measurement signals in accordance with the at least one virtual transmission periodicity.

In some examples, the link condition manager 715 may determine that the link condition satisfies a second threshold. In some examples, the periodicity manager 720 may adjust the transmission periodicity to correspond to the actual transmission periodicity based on the link condition satisfying the second threshold.

In some cases, the indication manager 745 may transmit, to one or more other devices, symbol timing information for transmitting the one or more measurement signals.

In some examples, the periodicity manager 720 may select the transmission periodicity to correspond to the at least one virtual transmission periodicity based on the link condition. In some examples, the indication manager 745 may transmit, to the second device, an indication that the transmission periodicity corresponds to the at least one virtual transmission periodicity.

In some examples, the indication manager 745 may receive an indication that the second device is monitoring for the one or more measurement signals in accordance with the at least one virtual transmission periodicity. In some examples, the periodicity manager 720 may select the transmission periodicity to correspond to the at least one virtual transmission periodicity based on the indication.

In some examples, the mode manager 750 may operate in a first transmission mode associated with the actual transmission periodicity. In some examples, the mode manager 750 may operate in a second transmission mode associated with the at least one virtual transmission periodicity. In some examples, the indication manager 745 may transmit an indication of the configuration via RRC signaling. In some examples, the monitoring component 725 may monitor for the one or more measurement signals transmitted from one or more other devices based on the timer expiring.

In some examples, the timing component 730 may start a timer based on adjusting the transmission periodicity to correspond to the at least one virtual transmission periodicity. In some examples, the timing component 730 may determine that the timer has expired. In some examples, the indication manager 745 may transmit, to one or more other devices, an indication to transmit the one or more measurement signals in accordance with the at least one virtual transmission periodicity based on the link condition.

In some examples, the signal manager 740 may transmit one or more measurement signals to a first set of one or more devices in accordance with a transmission periodicity. The indication manager 745 may receive, from a second device, an indication to adjust the transmission periodicity to at least one virtual transmission periodicity based on one or more parameters of a communication link between the second device and a second set of one or more devices. In some cases, the one or more parameters include a link condition.

In some examples, the signal manager 740 may transmit the one or more measurement signals to the second set of one or more devices in accordance with the at least one virtual transmission periodicity.

In some examples, the configuration manager 710 may receive a configuration of at least one virtual transmission periodicity used by the second device, the configuration being received prior to the indication from the second device, where the at least one virtual transmission periodicity is a based on the configuration. In some examples, the configuration manager 710 may determine a configuration of the at least one virtual transmission periodicity.

Additionally or alternatively, the indication manager 745 may receive, from a second device, symbol timing information and transmit the one or more measurement signals to the second set of one or more devices based on the symbol timing information.

In some cases, the at least one virtual transmission periodicity is shorter than the transmission periodicity. In some cases, the first device includes a first node in an IAB network, and the second device includes a second node in the IAB network.

Figure 8:
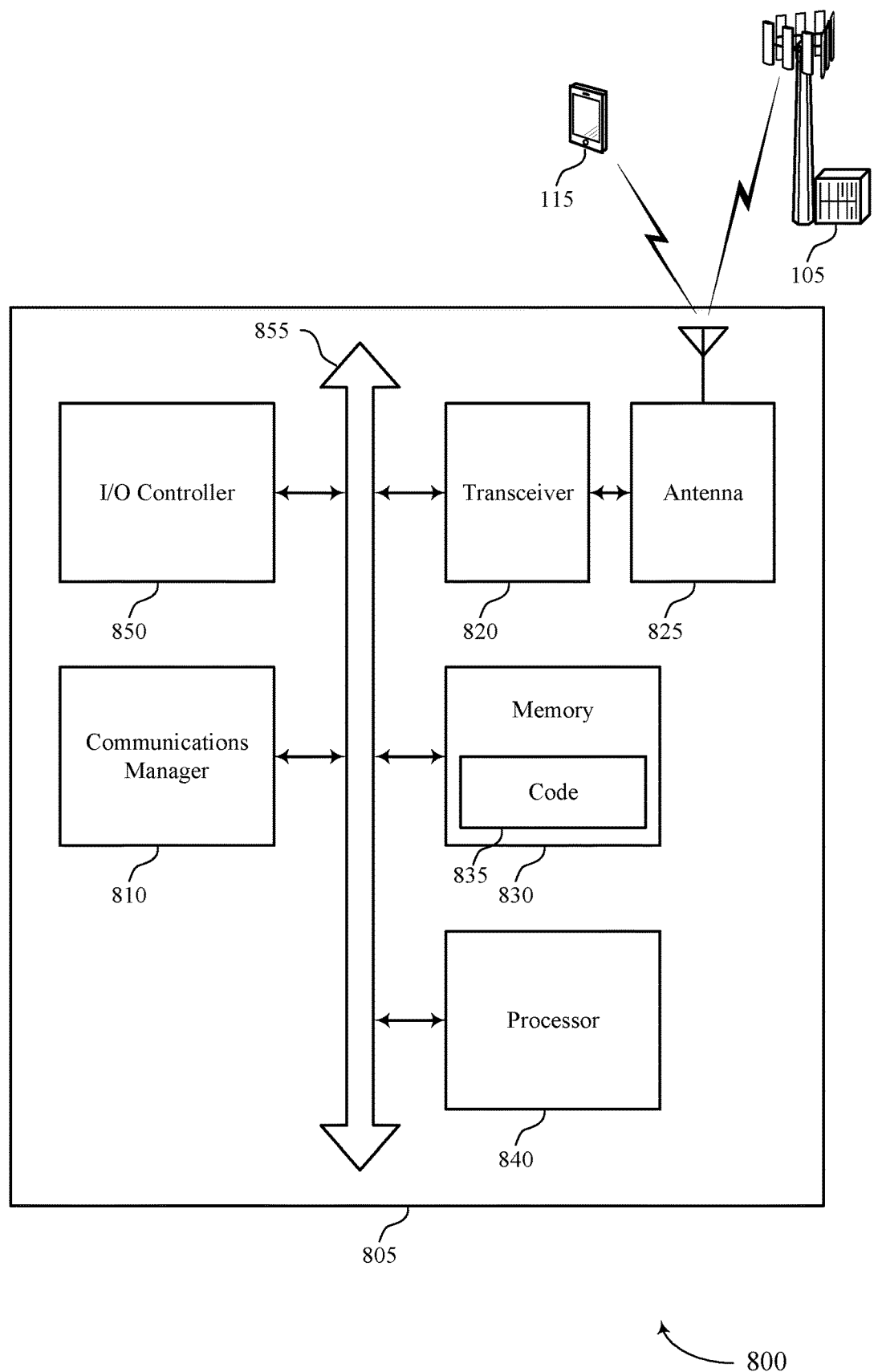
FIG. 8 shows a diagram of a system including a UE that supports synchronization signal periodicity adjustment in accordance with one or more aspects of the present disclosure.

FIG. 8 shows a diagram of a system 800 including a device 805 that supports synchronization signal periodicity adjustment in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may determine a configuration of an actual transmission periodicity and at least one virtual transmission periodicity used by a second device, select a monitoring periodicity corresponding to the actual transmission periodicity or the at least one virtual transmission periodicity based on one or more parameters, and monitor for one or more measurement signals transmitted by the second device over a communication link in accordance with the selected monitoring periodicity.

The communications manager 810 may also determine a configuration of an actual transmission periodicity and at least one virtual transmission periodicity, select a transmission periodicity corresponding to the actual transmission periodicity or the at least one virtual transmission periodicity based on one or more parameters, and transmit one or more measurement signals to a second device over a communication link in accordance with the selected transmission periodicity.

The communications manager 810 may also transmit one or more measurement signals to a first set of one or more devices in accordance with a transmission periodicity receive, from a second device, an indication to adjust the transmission periodicity to at least one virtual transmission periodicity based on one or more parameters of a communication link between the second device and a second set of one or more devices, and transmit the one or more measurement signals to the second set of one or more wireless devices in accordance with the at least one virtual transmission periodicity.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases, the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting synchronization signal periodicity adjustment).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
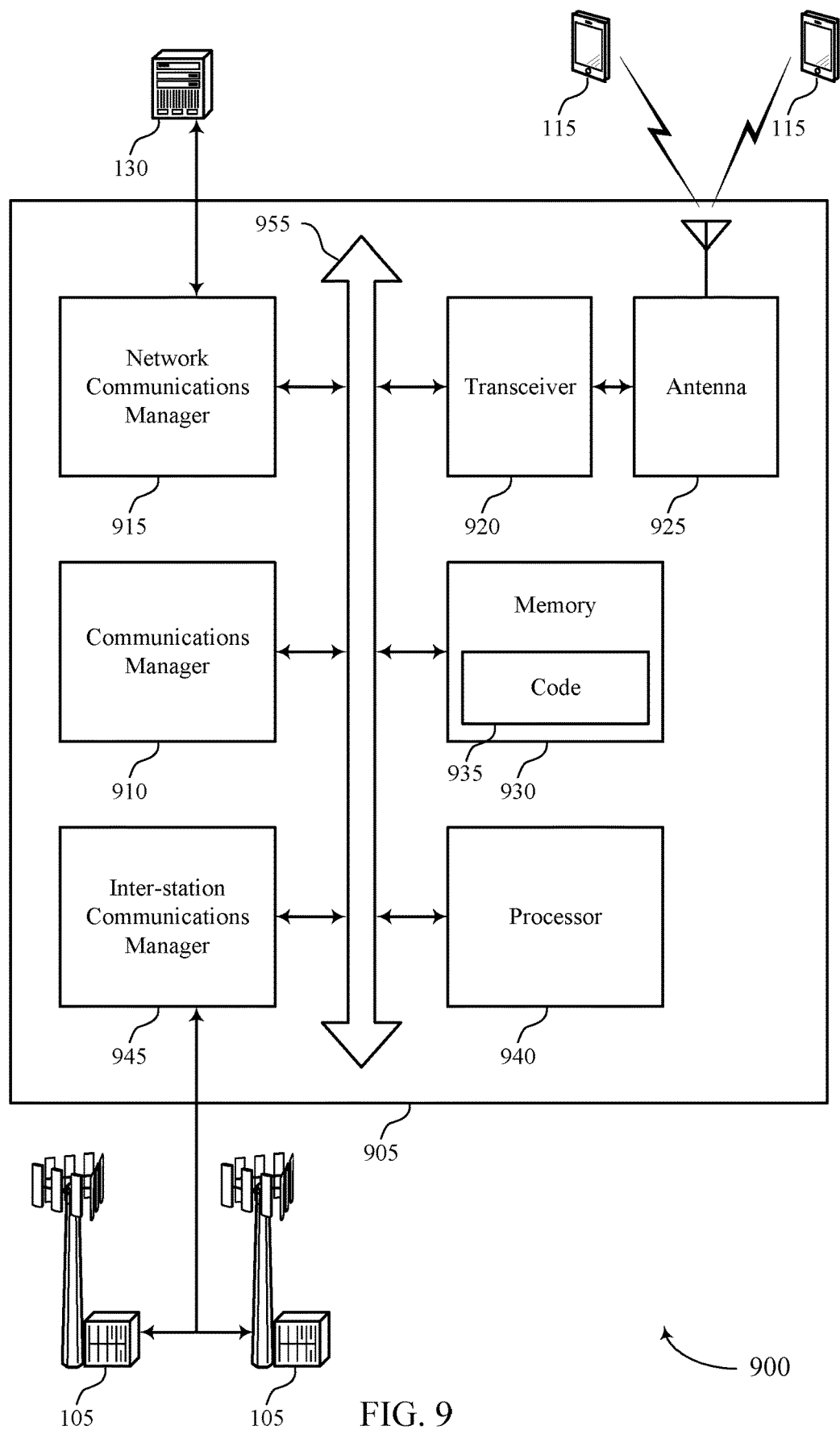
FIG. 9 shows a diagram of a system including a base station that supports synchronization signal periodicity adjustment in accordance with one or more aspects of the present disclosure.

FIG. 9 shows a diagram of a system 900 including a device 905 that supports synchronization signal periodicity adjustment in accordance with one or more aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may determine a configuration of an actual transmission periodicity and at least one virtual transmission periodicity used by a second device, select a monitoring periodicity corresponding to the actual transmission periodicity or the at least one virtual transmission periodicity based on one or more parameters, and monitor for one or more measurement signals transmitted by the second device over a communication link in accordance with the selected monitoring periodicity.

The communications manager 910 may also determine a configuration of an actual transmission periodicity and at least one virtual transmission periodicity, select a transmission periodicity corresponding to the actual transmission periodicity or the at least one virtual transmission periodicity based on one or more parameters, and transmit one or more measurement signals to a second device over a communication link in accordance with the selected transmission periodicity.

The communications manager 910 may also transmit one or more measurement signals to a first set of one or more devices in accordance with a transmission periodicity, receive, from a second device, an indication to adjust the transmission periodicity to at least one virtual transmission periodicity based on one or more parameters of a communication link between the second device and a second set of one or more devices, and transmit the one or more measurement signals to the second set of one or more devices in accordance with the at least one virtual transmission periodicity.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting synchronization signal periodicity adjustment).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
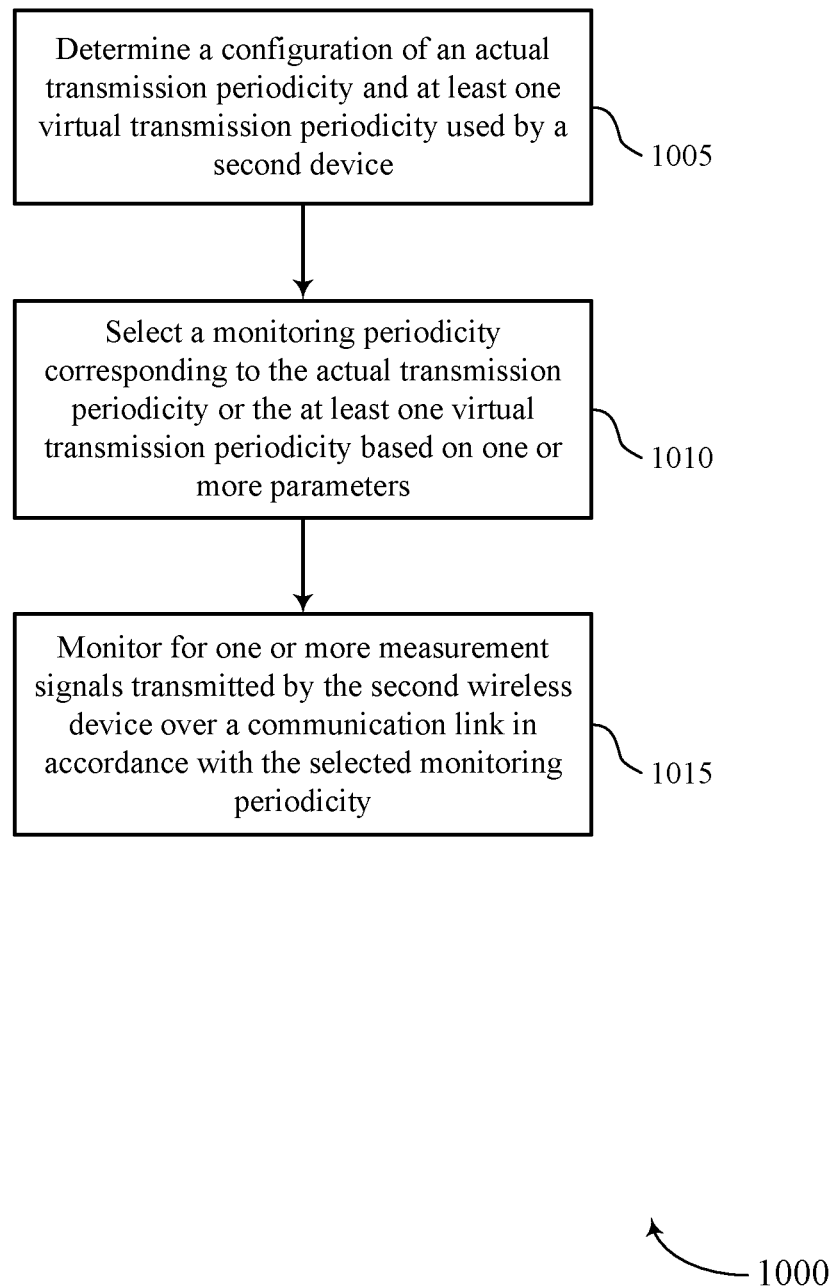
FIGS. 10 through 14 show flowcharts illustrating methods that support synchronization signal periodicity adjustment in accordance with one or more aspects of the present disclosure.

FIG. 10 shows a flowchart illustrating a method 1000 that supports synchronization signal periodicity adjustment in accordance with one or more aspects of the present disclosure. The operations of method 1000 may be implemented by a device (e.g., a wireless device), such as a UE 115 or base station 105, or its components as described herein. For example, the operations of method 1000 may be performed by a communications manager as described with reference to FIGS. 5 through 9. In some examples, a device may execute a set of instructions to control the functional elements of the device to perform the functions described herein. Additionally or alternatively, a device may perform aspects of the functions described herein using special-purpose hardware.

At 1005, the device may determine a configuration of an actual transmission periodicity and at least one virtual transmission periodicity used by a second device. The operations of 1005 may be performed according to the methods described herein. In some examples, aspects of the operations of 1005 may be performed by a configuration manager as described with reference to FIGS. 5 through 9.

At 1010, the device may select a monitoring periodicity corresponding to the actual transmission periodicity or the at least one virtual transmission periodicity based on one or more parameters. The operations of 1010 may be performed according to the methods described herein. In some examples, aspects of the operations of 1010 may be performed by a periodicity manager as described with reference to FIGS. 5 through 9.

At 1015, the device may monitor for one or more measurement signals transmitted by the second device over a communication link in accordance with the selected monitoring periodicity. The operations of 1015 may be performed according to the methods described herein. In some examples, aspects of the operations of 1015 may be performed by a monitoring component as described with reference to FIGS. 5 through 9.

Figure 11:
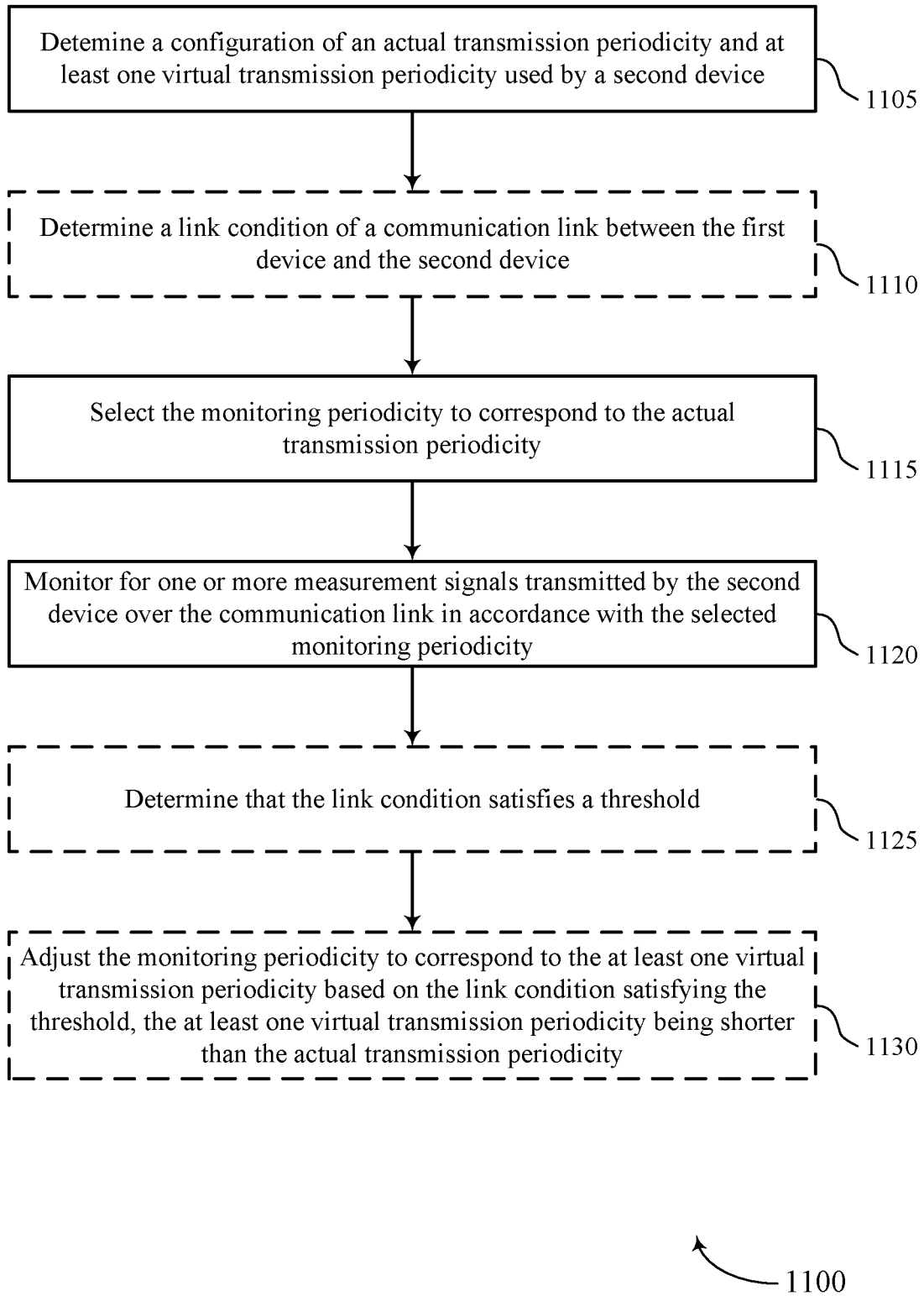

FIG. 11 shows a flowchart illustrating a method 1100 that supports synchronization signal periodicity adjustment in accordance with one or more aspects of the present disclosure. The operations of method 1100 may be implemented by a device (e.g., a wireless device), such as a UE 115 or base station 105, or its components as described herein. For example, the operations of method 1100 may be performed by a communications manager as described with reference to FIGS. 5 through 9. In some examples, a device may execute a set of instructions to control the functional elements of the device to perform the functions described herein. Additionally or alternatively, a device may perform aspects of the functions described herein using special-purpose hardware.

At 1105, the device may determine a configuration of an actual transmission periodicity and at least one virtual transmission periodicity used by a second device. The operations of 1105 may be performed according to the methods described herein. In some examples, aspects of the operations of 1105 may be performed by a configuration manager as described with reference to FIGS. 5 through 9.

At 1110, the device may determine a link condition of a communication link between the first device and the second device. The operations of 1110 may be performed according to the methods described herein. In some examples, aspects of the operations of 1110 may be performed by a link condition manager as described with reference to FIGS. 5 through 9.

At 1115, the device may select the monitoring periodicity to correspond to the actual transmission periodicity. The operations of 1115 may be performed according to the methods described herein. In some examples, aspects of the operations of 1115 may be performed by a periodicity manager as described with reference to FIGS. 5 through 9.

At 1120, the device may monitor for one or more measurement signals transmitted by the second device over the communication link in accordance with the selected monitoring periodicity. The operations of 1120 may be performed according to the methods described herein. In some examples, aspects of the operations of 1120 may be performed by a monitoring component as described with reference to FIGS. 5 through 9.

At 1125, the device may determine that the link condition satisfies a threshold. The operations of 1125 may be performed according to the methods described herein. In some examples, aspects of the operations of 1125 may be performed by a link condition manager as described with reference to FIGS. 5 through 9.

At 1130, the device may adjust the monitoring periodicity to correspond to the at least one virtual transmission periodicity based on the link condition satisfying the threshold, the at least one virtual transmission periodicity being shorter than the actual transmission periodicity. The operations of 1130 may be performed according to the methods described herein. In some examples, aspects of the operations of 1130 may be performed by a periodicity manager as described with reference to FIGS. 5 through 9.

Figure 12:
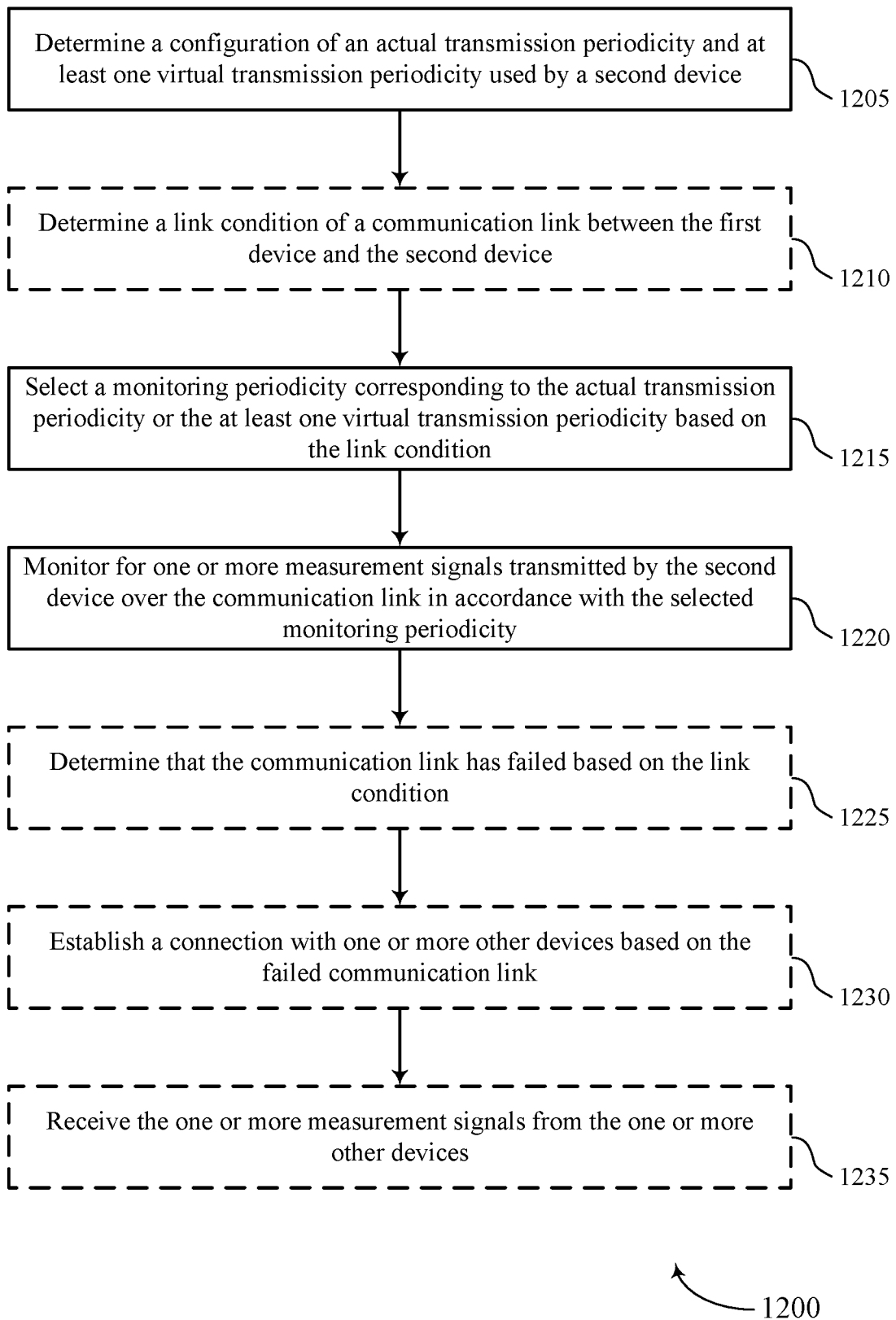

FIG. 12 shows a flowchart illustrating a method 1200 that supports synchronization signal periodicity adjustment in accordance with one or more aspects of the present disclosure. The operations of method 1200 may be implemented by a device (e.g., a wireless device), such as a UE 115 or base station 105, or its components as described herein. For example, the operations of method 1200 may be performed by a communications manager as described with reference to FIGS. 5 through 9. In some examples, a device may execute a set of instructions to control the functional elements of the device to perform the functions described herein. Additionally or alternatively, a device may perform aspects of the functions described herein using special-purpose hardware.

At 1205, the device may determine a configuration of an actual transmission periodicity and at least one virtual transmission periodicity used by a second device. The operations of 1205 may be performed according to the methods described herein. In some examples, aspects of the operations of 1205 may be performed by a configuration manager as described with reference to FIGS. 5 through 9.

At 1210, the device may determine a link condition of a communication link between the first device and the second device. The operations of 1210 may be performed according to the methods described herein. In some examples, aspects of the operations of 1210 may be performed by a link condition manager as described with reference to FIGS. 5 through 9.

At 1215, the device may select a monitoring periodicity corresponding to the actual transmission periodicity or the at least one virtual transmission periodicity based on the link condition. The operations of 1215 may be performed according to the methods described herein. In some examples, aspects of the operations of 1215 may be performed by a periodicity manager as described with reference to FIGS. 5 through 9.

At 1220, the device may monitor for one or more measurement signals transmitted by the second device over the communication link in accordance with the selected monitoring periodicity. The operations of 1220 may be performed according to the methods described herein. In some examples, aspects of the operations of 1220 may be performed by a monitoring component as described with reference to FIGS. 5 through 9.

At 1225, the device may determine that the communication link has failed based on the link condition. The operations of 1225 may be performed according to the methods described herein. In some examples, aspects of the operations of 1225 may be performed by a link condition manager as described with reference to FIGS. 5 through 9.

At 1230, the device may establish a connection with one or more other devices based on the failed communication link. The operations of 1230 may be performed according to the methods described herein. In some examples, aspects of the operations of 1230 may be performed by a connection manager as described with reference to FIGS. 5 through 9.

At 1235, the device may receive the one or more measurement signals from the one or more other devices. The operations of 1235 may be performed according to the methods described herein. In some examples, aspects of the operations of 1235 may be performed by a signal manager as described with reference to FIGS. 5 through 9.

Figure 13:
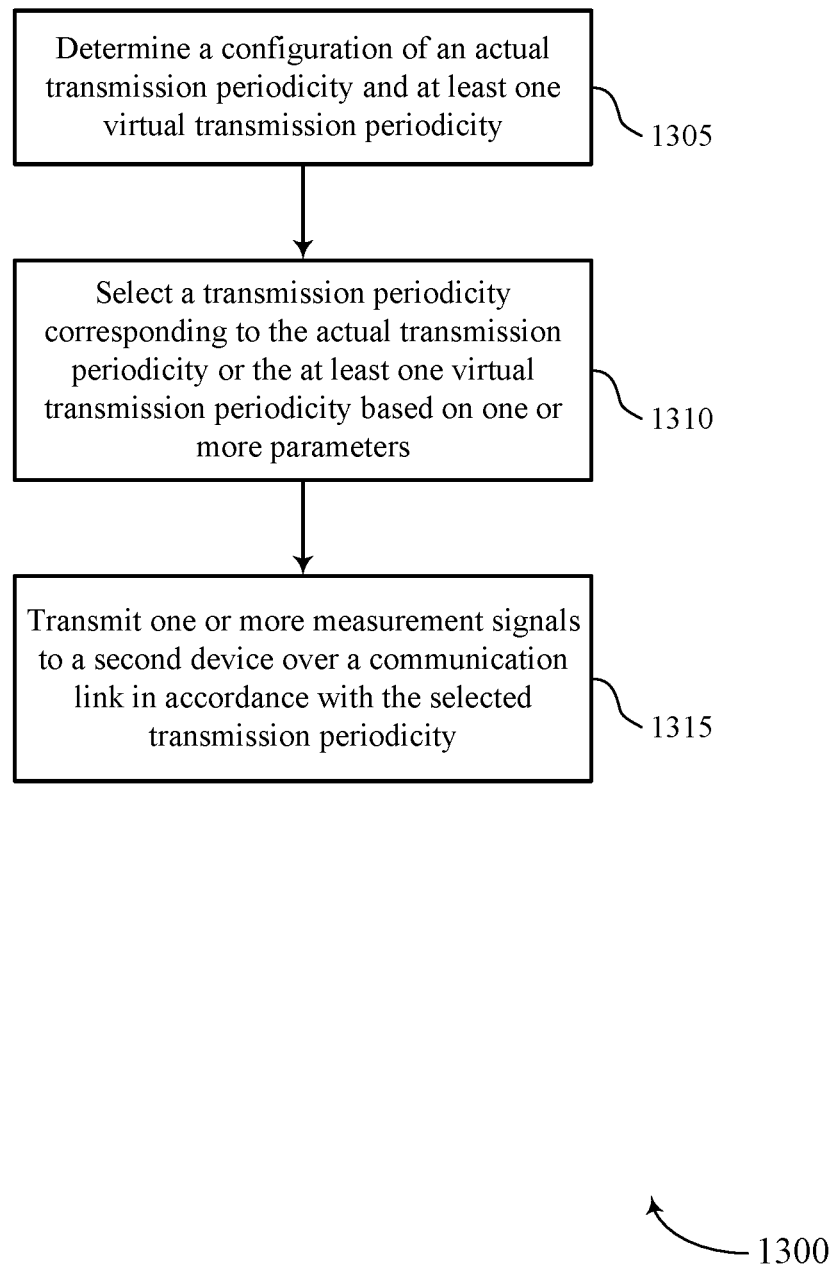

FIG. 13 shows a flowchart illustrating a method 1300 that supports synchronization signal periodicity adjustment in accordance with one or more aspects of the present disclosure. The operations of method 1300 may be implemented by a device (e.g., a wireless device), such as a UE 115 or base station 105, or its components as described herein. For example, the operations of method 1300 may be performed by a communications manager as described with reference to FIGS. 5 through 9. In some examples, a device may execute a set of instructions to control the functional elements of the device to perform the functions described herein. Additionally or alternatively, a device may perform aspects of the functions described herein using special-purpose hardware.

At 1305, the device may determine a configuration of an actual transmission periodicity and at least one virtual transmission periodicity. The operations of 1305 may be performed according to the methods described herein. In some examples, aspects of the operations of 1305 may be performed by a configuration manager as described with reference to FIGS. 5 through 9.

At 1310, the device may select a transmission periodicity corresponding to the actual transmission periodicity or the at least one virtual transmission periodicity based on one or more parameters. The operations of 1310 may be performed according to the methods described herein. In some examples, aspects of the operations of 1310 may be performed by a periodicity manager as described with reference to FIGS. 5 through 9.

At 1315, the device may transmit one or more measurement signals to a second device over a communication link in accordance with the selected transmission periodicity. The operations of 1315 may be performed according to the methods described herein. In some examples, aspects of the operations of 1315 may be performed by a signal manager as described with reference to FIGS. 5 through 9.

Figure 14:
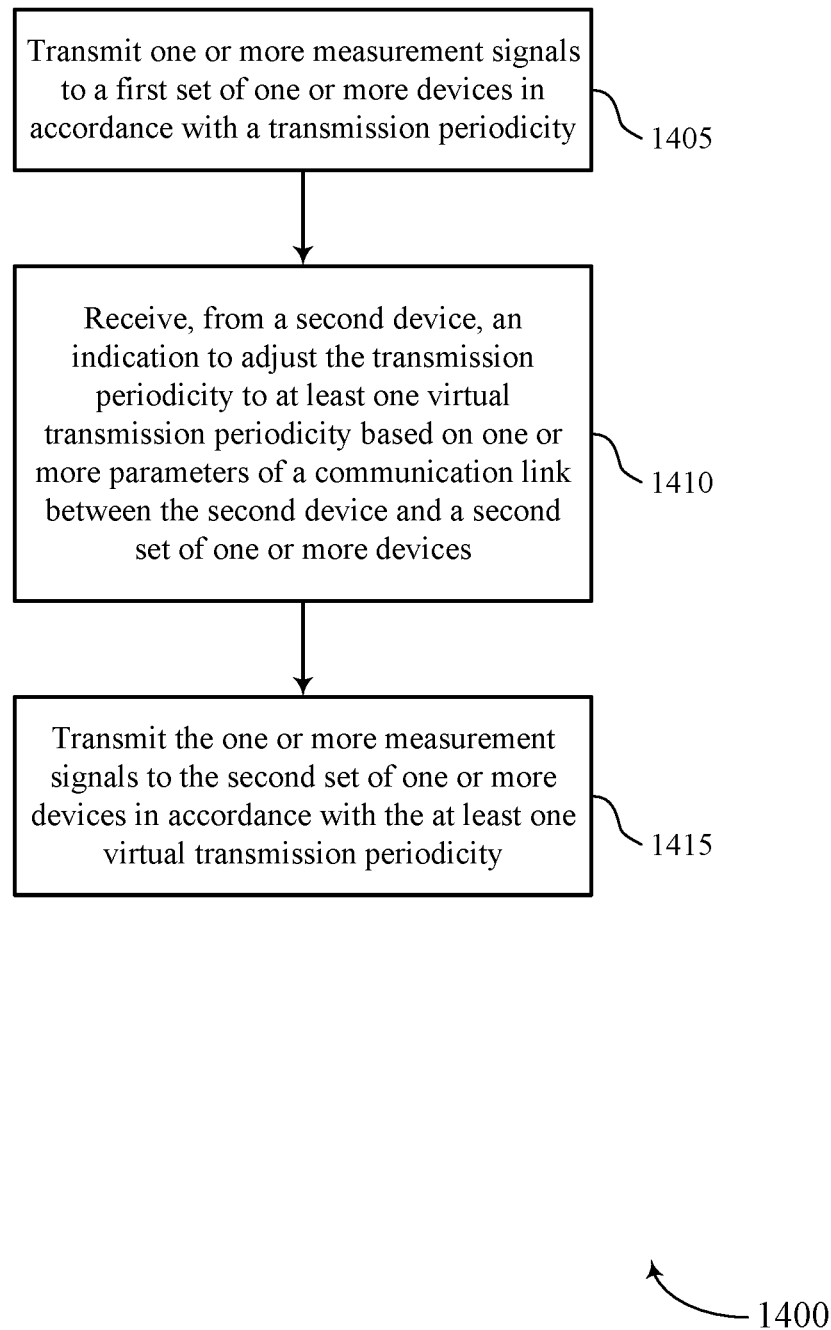

FIG. 14 shows a flowchart illustrating a method 1400 that supports synchronization signal periodicity adjustment in accordance with one or more aspects of the present disclosure. The operations of method 1400 may be implemented by a device (e.g., a wireless device), such as a UE 115 or base station 105, or its components as described herein. For example, the operations of method 1400 may be performed by a communications manager as described with reference to FIGS. 5 through 9. In some examples, a device may execute a set of instructions to control the functional elements of the device to perform the functions described herein. Additionally or alternatively, a device may perform aspects of the functions described herein using special-purpose hardware.

At 1405, the device may transmit one or more measurement signals to a first set of one or more wireless devices in accordance with a transmission periodicity. The operations of 1405 may be performed according to the methods described herein. In some examples, aspects of the operations of 1405 may be performed by a signal manager as described with reference to FIGS. 5 through 9.

At 1410, the device may receive, from a second device, an indication to adjust the transmission periodicity to at least one virtual transmission periodicity based on one or more parameters of a communication link between the second device and a second set of one or more devices. The operations of 1410 may be performed according to the methods described herein. In some examples, aspects of the operations of 1410 may be performed by an indication manager as described with reference to FIGS. 5 through 9.

At 1415, the device may transmit the one or more measurement signals to the second set of one or more devices in accordance with the at least one virtual transmission periodicity. The operations of 1415 may be performed according to the methods described herein. In some examples, aspects of the operations of 1415 may be performed by a signal manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Example 1

A method for communications at a first device, comprising: determining a configuration of an actual transmission periodicity and at least one virtual transmission periodicity used by a second device; selecting a monitoring periodicity corresponding to the actual transmission periodicity or the at least one virtual transmission periodicity based at least in part on one or more parameters; and monitoring for one or more measurement signals transmitted by the second device over a communication link in accordance with the selected monitoring periodicity.

Example 2

The method of example 1, wherein the one or more parameters comprise a link condition.

Example 3

The method of example 2, wherein the link condition comprises an error rate for information transmitted over the communication link.

Example 4

The method of any of examples 1 to 3, further comprising: determining a link condition of the communication link between the first device and the second device.

Example 5

The method of any of examples 1 to 5, further comprising: selecting the monitoring periodicity to correspond to the actual transmission periodicity; determining that a link condition satisfies a threshold; and adjusting the monitoring periodicity to correspond to the at least one virtual transmission periodicity based at least in part on the link condition satisfying the threshold, the at least one virtual transmission periodicity being shorter than the actual transmission periodicity.

Example 6

The method of example 5, further comprising: starting a timer based at least in part on adjusting the monitoring periodicity to correspond to the at least one virtual transmission periodicity; determining that the timer has expired; and monitoring for the one or more measurement signals transmitted from one or more other devices based at least in part on the timer expiring.

Example 7

The method of any of examples 5 or 6, further comprising: determining that the link condition satisfies a second threshold; and adjusting the monitoring periodicity to correspond to the actual transmission periodicity based at least in part on the link condition satisfying the second threshold.

Example 8

The method of any of examples 1 to 7, further comprising: determining that the communication link has failed based at least in part on a link condition; establishing a connection with one or more other devices based at least in part on the failed communication link; and receiving the one or more measurement signals from the one or more other devices.

Example 9

The method of any of examples 1 to 8, further comprising: receiving an indication that the second device is transmitting the one or more measurement signals in accordance with the at least one virtual transmission periodicity; and selecting the monitoring periodicity to correspond to the at least one virtual transmission periodicity based at least in part on the indication.

Example 10

The method of any of examples 1 to 10, further comprising: selecting the monitoring periodicity to correspond to the at least one virtual transmission periodicity based at least in part on a link condition; and transmitting, to the second device, an indication that the monitoring periodicity corresponds to the at least one virtual transmission periodicity.

Example 11

The method of any of examples 1 to 10, further comprising: operating in a first monitoring mode associated with the actual transmission periodicity.

Example 12

The method of any of examples 1 to 11, further comprising: operating in a second monitoring mode associated with the at least one virtual transmission periodicity.

Example 13

The method of any of examples 1 to 12, wherein determining the configuration of the actual transmission periodicity and the at least one virtual transmission periodicity comprises: receiving an indication of the configuration via RRC signaling.

Example 14

The method of any of examples 1 to 13, further comprising: receiving the one or more measurement signals from the second device based at least in part on the monitoring.

Example 15

The method of any of examples 1 to 14, wherein the one or more measurement signals comprise SSBs, or CSI-RSs, or SRSs, or a combination thereof.

Example 16

The method of any of examples 1 to 15, wherein the first device comprises a first node in an IAB network and the second device comprises a second node in the IAB network.

Example 17

The method of any of examples 1 to 16, wherein the communication link comprises one or more directional beams operating over a mmW radio frequency spectrum band.

Example 18

An apparatus comprising at least one means for performing a method of any of examples 1 to 17.

Example 19

An apparatus for wireless communications comprising a processor; and memory coupled to the processor, the processor and memory configured to perform a method of any of examples 1 to 17.

Example 20

A non-transitory computer-readable medium storing code for wireless communications, the code comprising instructions executable by a processor to perform a method of any of examples 1 to 17. Example 21: A method for communications at a first device, comprising: determining a configuration of an actual transmission periodicity and at least one virtual transmission periodicity; selecting a transmission periodicity corresponding to the actual transmission periodicity or the at least one virtual transmission periodicity based at least in part on one or more parameters; and transmitting one or more measurement signals to a second device over a communication link in accordance with the selected transmission periodicity.

Example 22

The method of example 21, wherein the one or more parameters comprise a link condition.

Example 23

The method of any of examples 21 or 22, further comprising: determining a link condition of a communication link between the first device and the second device.

Example 24

The method of any of examples 21 to 23, further comprising: selecting the transmission periodicity to correspond to the actual transmission periodicity; determining that a link condition satisfies a threshold; and adjusting the transmission periodicity to correspond to the at least one virtual transmission periodicity based at least in part on the link condition satisfying the threshold, the at least one virtual transmission periodicity being shorter than the actual transmission periodicity.

Example 25

The method of example 24, further comprising: starting a timer based at least in part on adjusting the transmission periodicity to correspond to the at least one virtual transmission periodicity; determining that the timer has expired; and transmitting, to one or more other devices, an indication to transmit the one or more measurement signals in accordance with the at least one virtual transmission periodicity.

Example 26

The method of any of examples 24 or 25, further comprising: determining that the link condition satisfies a second threshold; and adjusting the transmission periodicity to correspond to the actual transmission periodicity based at least in part on the link condition satisfying the second threshold.

Example 27

The method of any of examples 21 to 26, further comprising: transmitting, to one or more other devices, an indication to transmit the one or more measurement signals in accordance with the at least one virtual transmission periodicity based at least in part on a link condition.

Example 28

The method of any of examples 21 to 27, further comprising: transmitting, to one or more other devices, symbol timing information for transmitting the one or more measurement signals.

Example 29

The method of any of examples 21 to 28, further comprising: selecting the transmission periodicity to correspond to the at least one virtual transmission periodicity based at least in part on a link condition; and transmitting, to the second device, an indication that the transmission periodicity corresponds to the at least one virtual transmission periodicity.

Example 30

The method of any of examples 21 to 29, further comprising: receiving an indication that the second device is monitoring for the one or more measurement signals in accordance with the at least one virtual transmission periodicity; and selecting the transmission periodicity to correspond to the at least one virtual transmission periodicity based at least in part on the indication.

Example 31

The method of any of examples 21 to 30, further comprising: operating in a first transmission mode associated with the actual transmission periodicity.

Example 32

The method of any of examples 21 to 31, further comprising: operating in a second transmission mode associated with the at least one virtual transmission periodicity.

Example 33

The method of any of examples 21 to 32, wherein transmitting the configuration of the actual transmission periodicity and the at least one virtual transmission periodicity comprises: transmitting an indication of the configuration via RRC signaling.

Example 34

An apparatus comprising at least one means for performing a method of any of examples 21 to 33.

Example 35

An apparatus for wireless communications comprising a processor; and memory coupled to the processor, the processor and memory configured to perform a method of any of examples 21 to 33.

Example 36

A non-transitory computer-readable medium storing code for wireless communications, the code comprising instructions executable by a processor to perform a method of any of examples 21 to 33.

Example 37

A method for communications at a first device, comprising: transmitting one or more measurement signals to a first set of one or more devices in accordance with a transmission periodicity; receiving, from a second device, an indication to adjust the transmission periodicity to at least one virtual transmission periodicity based at least in part on one or more parameters of a communication link between the second device and a second set of one or more devices; and transmitting the one or more measurement signals to the second set of one or more devices in accordance with the at least one virtual transmission periodicity.

Example 38

The method of example 37, wherein the one or more parameters comprise a link condition.

Example 39

The method of any of examples 37 or 38, further comprising: receiving a configuration of at least one virtual transmission periodicity used by the second device, the configuration being received prior to the indication from the second device, wherein the at least one virtual transmission periodicity is a based at least in part on the configuration.

Example 40

The method of any of examples 37 to 39, further comprising: determining a configuration of the at least one virtual transmission periodicity.

Example 41

The method of any of examples 37 to 40, further comprising: receiving, from a second device, symbol timing information; and transmitting the one or more measurement signals to the second set of one or more devices based at least in part on the symbol timing information.

Example 42

The method of any of examples 37 to 41, wherein the at least one virtual transmission periodicity is shorter than the transmission periodicity.

Example 43

The method of any of examples 37 to 42, wherein the first wireless device comprises a first node in an IAB network and the second wireless device comprises a second node in the IAB network.

Example 44

An apparatus comprising at least one means for performing a method of any of examples 37 to 43.

Example 45

An apparatus for wireless communications comprising a processor; and memory coupled to the processor, the processor and memory configured to perform a method of any of examples 37 to 43.

Example 46

A non-transitory computer-readable medium storing code for wireless communications, the code comprising instructions executable by a processor to perform a method of any of examples 37 to 43.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communications at a first device, comprising:
   determining a configuration of an actual transmission periodicity and at least one virtual transmission periodicity used by a second device;
   selecting a monitoring periodicity corresponding to the actual transmission periodicity based at least in part on one or more parameters, wherein the monitoring periodicity corresponds to a periodicity that measurement signals are transmitted by the second device;
   monitoring for one or more measurement signals transmitted by the second device over a communication link in accordance with the selected monitoring periodicity; and
   adjusting the monitoring periodicity to correspond to the at least one virtual transmission periodicity based at least in part on an indication of an error rate of the communication link increasing, the at least one virtual transmission periodicity associated with a monitoring period greater in duration than the actual transmission periodicity.

2. The method of claim 1, wherein the one or more parameters comprise a link quality.

3. The method of claim 2, wherein the link quality comprises the error rate for information transmitted over the communication link.

4. The method of claim 1, further comprising:
   determining a link quality of the communication link between the first device and the second device.

5. The method of claim 1, further comprising:
   determining that a link quality satisfies a threshold, wherein adjusting the monitoring periodicity to correspond to the at least one virtual transmission periodicity is based at least in part on the link quality satisfying the threshold.

6. The method of claim 5, further comprising:
   starting a timer based at least in part on adjusting the monitoring periodicity to correspond to the at least one virtual transmission periodicity;
   determining that the timer has expired; and
   monitoring for the one or more measurement signals transmitted from one or more other devices based at least in part on the timer expiring.

7. The method of claim 5, further comprising:
   determining that the link quality satisfies a second threshold; and
   adjusting the monitoring periodicity to correspond to the actual transmission periodicity based at least in part on the link quality satisfying the second threshold.

8. The method of claim 1, further comprising:
   determining that the communication link has failed based at least in part on a link quality;
   establishing a connection with one or more other devices based at least in part on the failed communication link; and
   receiving the one or more measurement signals from the one or more other devices.

9. The method of claim 1, further comprising:
   receiving an indication that the second device is transmitting the one or more measurement signals in accordance with the at least one virtual transmission periodicity; and
   selecting the monitoring periodicity to correspond to the at least one virtual transmission periodicity based at least in part on the indication.

10. The method of claim 1, further comprising:
selecting the monitoring periodicity to correspond to the at least one virtual transmission periodicity based at least in part on a link quality; and
transmitting, to the second device, an indication that the monitoring periodicity corresponds to the at least one virtual transmission periodicity.

11. The method of claim 1, further comprising:
operating in a first monitoring mode associated with the actual transmission periodicity; and
operating in a second monitoring mode associated with the at least one virtual transmission periodicity.

12. The method of claim 1, wherein determining the configuration of the actual transmission periodicity and the at least one virtual transmission periodicity comprises:
receiving an indication of the configuration via radio resource control signaling.

13. A method for communications at a first device, comprising:
determining a configuration of an actual transmission periodicity and at least one virtual transmission periodicity;
selecting a transmission periodicity corresponding to the actual transmission periodicity based at least in part on one or more parameters, wherein the transmission periodicity corresponds to a periodicity that measurement signals are transmitted by the first device;
transmitting one or more measurement signals to a second device over a communication link in accordance with the selected transmission periodicity; and
adjusting the transmission periodicity to correspond to the at least one virtual transmission periodicity based at least in part on an indication of an error rate of the communication link increasing, the at least one virtual transmission periodicity associated with a transmission period greater in duration than the actual transmission periodicity.

14. The method of claim 13, wherein the one or more parameters comprise a link quality.

15. The method of claim 13, further comprising:
determining a link quality of the communication link between the first device and the second device.

16. The method of claim 13, further comprising:
determining that a link quality satisfies a threshold, wherein adjusting the transmission periodicity to correspond to the at least one virtual transmission periodicity is based at least in part on the link quality satisfying the threshold.

17. The method of claim 16, further comprising:
starting a timer based at least in part on adjusting the transmission periodicity to correspond to the at least one virtual transmission periodicity;
determining that the timer has expired; and
transmitting, to one or more other devices, an indication to transmit the one or more measurement signals in accordance with the at least one virtual transmission periodicity.

18. The method of claim 16, further comprising:
determining that the link quality satisfies a second threshold; and
adjusting the transmission periodicity to correspond to the actual transmission periodicity based at least in part on the link quality satisfying the second threshold.

19. The method of claim 13, further comprising:
transmitting, to one or more other devices, an indication to transmit the one or more measurement signals in accordance with the at least one virtual transmission periodicity based at least in part on a link quality.

20. The method of claim 13, further comprising:
transmitting, to one or more other devices, symbol timing information for transmitting the one or more measurement signals.

21. The method of claim 13, further comprising:
selecting the transmission periodicity to correspond to the at least one virtual transmission periodicity based at least in part on a link quality; and
transmitting, to the second device, an indication that the transmission periodicity corresponds to the at least one virtual transmission periodicity.

22. The method of claim 13, further comprising:
receiving an indication that the second device is monitoring for the one or more measurement signals in accordance with the at least one virtual transmission periodicity; and
selecting the transmission periodicity to correspond to the at least one virtual transmission periodicity based at least in part on the indication.

23. The method of claim 13, further comprising:
operating in a first transmission mode associated with the actual transmission periodicity; and
operating in a second transmission mode associated with the at least one virtual transmission periodicity.

24. A method for communications at a first device, comprising:
transmitting one or more measurement signals to a first set of one or more devices in accordance with a transmission periodicity;
receiving, from a second device and based at least in part on one or more parameters of a communication link between the second device and a second set of one or more devices, an indication to adjust the transmission periodicity to at least one virtual transmission periodicity; and
transmitting the one or more measurement signals to the second set of one or more devices in accordance with the at least one virtual transmission periodicity.

25. The method of claim 24, wherein the one or more parameters comprise a link quality condition.

26. The method of claim 24, further comprising:
receiving a configuration of at least one virtual transmission periodicity used by the second device, the configuration being received prior to the indication from the second device, wherein the at least one virtual transmission periodicity is based at least in part on the configuration.

27. The method of claim 24, further comprising:
determining a configuration of the at least one virtual transmission periodicity.

28. The method of claim 24, further comprising:
receiving, from a second device, symbol timing information; and
transmitting the one or more measurement signals to the second set of one or more devices based at least in part on the symbol timing information.

29. The method of claim 24, wherein the at least one virtual transmission periodicity is shorter than the transmission periodicity.

30. An apparatus for communications at a first device, comprised of:
a processor, and
memory coupled with the processor, the processor configured to:

determine a configuration of an actual transmission periodicity and at least one virtual transmission periodicity used by a second device;

select a monitor periodicity that corresponds to the actual transmission periodicity based at least in part on one or more parameters, wherein the monitor periodicity corresponds to a periodicity of measurement signal transmissions;

monitor for one or more measurement signals transmitted by the second device over a communication link in accordance with the selected monitor periodicity; and adjust the monitor periodicity to correspond to the at least one virtual transmission periodicity based at least in part on an indication that an error rate of the communication link increased, the at least one virtual transmission periodicity associated with a monitoring period greater in duration than the actual transmission periodicity.

31. The apparatus of claim 30, wherein the processor is further configured to:

determine a link quality of the communication link between the first device and the second device.

32. The apparatus of claim 30, wherein the processor is further configured to:

determine that a link quality satisfies a threshold, wherein adjustment of the monitor periodicity to correspond to the at least one virtual transmission periodicity is based at least in part on satisfaction of the link quality to the threshold.

33. A non-transitory computer-readable medium storing code for communication at a first device, the code comprising instructions executable by a processor to:

determine a configuration of an actual transmission periodicity and at least one virtual transmission periodicity used by a second device;

select a monitoring periodicity corresponding to the actual transmission periodicity based at least in part on one or more parameters, wherein the monitoring periodicity corresponds to a periodicity that measurement signals are transmitted by the second device;

monitor for one or more measurement signals transmitted by the second device over a communication link in accordance with the selected monitoring periodicity; and adjust the monitoring periodicity to correspond to the at least one virtual transmission periodicity based at least in part on an indication that an error rate of the communication link increased, the at least one virtual transmission periodicity associated with a monitoring period greater in duration than the actual transmission periodicity.

34. The non-transitory computer-readable medium of claim 33, wherein the instructions are further executable by the processor to:

determine a link quality of the communication link between the first device and the second device.

35. The non-transitory computer-readable medium of claim 33, wherein the instructions are further executable by the processor to:

determine that a link quality satisfies a threshold, wherein adjustment of the monitoring periodicity to correspond to the at least one virtual transmission periodicity is based at least in part on satisfaction of the link quality to the threshold.

36. An apparatus for communications at a first device, comprised of:

a processor, and memory coupled with the processor, the processor configured to:

determine a configuration of an actual transmission periodicity and at least one virtual transmission periodicity;

select a transmission periodicity that corresponds to the actual transmission periodicity based at least in part on one or more parameters, wherein the transmission periodicity corresponds to a periodicity of measurement signal transmissions by the first device;

transmit one or more measurement signals to a second device over a communication link in accordance with the selected transmission periodicity; and adjust the transmission periodicity to correspond to the at least one virtual transmission periodicity based at least in part on an indication that an error rate of the communication link increased, the at least one virtual transmission periodicity associated with a transmission period greater in duration than the actual transmission periodicity.

37. The apparatus of claim 36, wherein the processor is further configured to:

determine a link quality of the communication link between the first device and the second device.

38. The apparatus of claim 36, wherein the processor is further configured to:

determine that a link quality satisfies a threshold, wherein adjustment the transmission periodicity to correspond to the at least one virtual transmission periodicity is based at least in part on satisfaction of the link quality the threshold.

39. A non-transitory computer-readable medium storing code for communication at a first device, the code comprising instructions executable by a processor to:

determine a configuration of an actual transmission periodicity and at least one virtual transmission periodicity;

select a transmission periodicity corresponding to the actual transmission periodicity based at least in part on one or more parameters, wherein the transmission periodicity corresponds to a periodicity that measurement signals are transmitted by the first device;

transmit one or more measurement signals to a second device over a communication link in accordance with the selected transmission periodicity; and adjust the transmission periodicity to correspond to the at least one virtual transmission periodicity based at least in part on an indication that an error rate of the communication link increased, the at least one virtual transmission periodicity associated with a transmission period greater in duration than the actual transmission periodicity.

40. The non-transitory computer-readable medium of claim 39, wherein the instructions are further executable by the processor to:

determine a link quality of the communication link between the first device and the second device.

41. The non-transitory computer-readable medium of claim 39, wherein the instructions are further executable by the processor to:

determine that a link quality satisfies a threshold, wherein adjustment of the transmission periodicity to correspond to the at least one virtual transmission periodicity is based at least in part on satisfaction of the link quality to the threshold.

42. An apparatus for communications at a first device, comprised of:
a processor, and
memory coupled with the processor, the processor configured to:
transmit one or more measurement signals to a first set of one or more devices in accordance with a transmission periodicity;
receive, from a second device and based at least in part on one or more parameters of a communication link between the second device and a second set of one or more devices, an indication to adjust the transmission periodicity to at least one virtual transmission periodicity; and
transmit the one or more measurement signals to the second set of one or more devices in accordance with the at least one virtual transmission periodicity.

43. The apparatus of claim 42, wherein the processor is further configured to:
receive a configuration of at least one virtual transmission periodicity used by the second device, the configuration received prior to the indication from the second device, wherein the at least one virtual transmission periodicity is based at least in part on the configuration.

44. The apparatus of claim 42, wherein the at least one virtual transmission periodicity is shorter than the transmission periodicity.

45. A non-transitory computer-readable medium storing code for communication at a first device, the code comprising instructions executable by a processor to:
transmit one or more measurement signals to a first set of one or more devices in accordance with a transmission periodicity;
receive, from a second device and based at least in part on one or more parameters of a communication link between the second device and a second set of one or more devices, an indication to adjust the transmission periodicity to at least one virtual transmission periodicity; and
transmit the one or more measurement signals to the second set of one or more devices in accordance with the at least one virtual transmission periodicity.

46. The non-transitory computer-readable medium of claim 45, wherein the instructions are further executable by the processor to:
receive a configuration of at least one virtual transmission periodicity used by the second device, the configuration received prior to the indication from the second device, wherein the at least one virtual transmission periodicity is based at least in part on the configuration.

47. The non-transitory computer-readable medium of claim 45, wherein the at least one virtual transmission periodicity is shorter than the transmission periodicity.

* * * * *